US009239186B2

(12) United States Patent
Jung et al.

(10) Patent No.: US 9,239,186 B2
(45) Date of Patent: Jan. 19, 2016

(54) METHOD FOR OPERATING FUEL SUPPLY SYSTEM FOR MARINE STRUCTURE HAVING RELIQUEFACTION APPARATUS AND HIGH-PRESSURE NATURAL GAS INJECTION ENGINE

(75) Inventors: Seung Kyo Jung, Busan (KR); Je Heon Jung, Geoje-si (KR); Jung Han Lee, Geoje-si (KR); Hyun Jun Shin, Seoul (KR); Sung Jun Lee, Seoul (KR); Dong Kyu Choi, Geoje-si (KR)

(73) Assignee: DAEWOO SHIPBUILDING & MARINE ENGINEERING CO., LTD., Seoul (KR)

( * ) Notice: Subject to any disclaimer, the term of this patent is extended or adjusted under 35 U.S.C. 154(b) by 338 days.

(21) Appl. No.: 14/004,669
(22) PCT Filed: Dec. 20, 2011
(86) PCT No.: PCT/KR2011/009823
  § 371 (c)(1),
  (2), (4) Date: Nov. 18, 2013
(87) PCT Pub. No.: WO2012/124885
  PCT Pub. Date: Sep. 20, 2012

(65) Prior Publication Data
  US 2014/0075943 A1 Mar. 20, 2014

(30) Foreign Application Priority Data
  Mar. 11, 2011 (KR) .................. 10-2011-0022101
  Sep. 23, 2011 (KR) .................. 10-2011-0096463
  Oct. 21, 2011 (KR) .................. 10-2011-0107922

(51) Int. Cl.
  *F25B 19/00* (2006.01)
  *F17C 9/04* (2006.01)
  (Continued)

(52) U.S. Cl.
  CPC .......... *F25J 1/0025* (2013.01); *F02M 21/0227* (2013.01); *F02M 21/0245* (2013.01);
  (Continued)

(58) Field of Classification Search
  CPC ......... F25J 1/0025; F25J 1/0291; F25J 1/023; F25J 1/0097; F25J 1/0052; F25J 1/0277; F25J 1/0278; F25J 1/0254; F25J 1/0212; F25J 2220/62; F25J 2230/30; F25J 2230/60; F25J 2290/62; F17C 5/04; F02M 21/0227; F02M 21/0287; F02M 21/0245; Y02T 10/32
  USPC ................... 62/7, 45.1, 48.1, 50.2, 50.3, 611
  See application file for complete search history.

(56) References Cited

U.S. PATENT DOCUMENTS 6,530,241 B2   3/2003 Pozivil
6,564,579 B1 * 5/2003 McCartney .................. 62/620
(Continued)

FOREIGN PATENT DOCUMENTS

KR 10-2001-0089142 A   9/2001
KR 10-2006-0123675 A  12/2006
(Continued)

OTHER PUBLICATIONS

International Search Report dated Jul. 25, 2012 of PCT/KR2011/009823 which is the parent application—2 pages.

*Primary Examiner* — Hoang Nguyen
(74) *Attorney, Agent, or Firm* — Knobbe Martens Olson & Bear LLP

(57) ABSTRACT

Provided is a method for operating a fuel supply system for a marine structure. The fuel supply system includes a BOG compression unit configured to receive and compress BOG generated in a storage tank, a reliquefaction apparatus configured to receive and liquefy the BOG compressed by the BOG compression unit, a high-pressure pump configured to compress the liquefied BOG generated by the reliquefaction apparatus, and a high-pressure gasifier configured to gasify the liquefied BOG compressed by the high-pressure pump. The fuel supply system includes a recondenser installed at an upstream side of the high-pressure pump, and the recondenser recondenses a portion or all of the generated BOG by using liquefied gas supplied from the storage tank. During a ballast voyage process, all of the BOG is supplied to and recondensed by the recondenser, and an operation of the reliquefaction apparatus is interrupted.

10 Claims, 18 Drawing Sheets

(51) Int. Cl.
*F25J 1/00* (2006.01)
*F02M 21/02* (2006.01)
*F17C 5/04* (2006.01)
*F25J 1/02* (2006.01)

(52) U.S. Cl.
CPC .............. *F02M21/0287* (2013.01); *F17C 5/04* (2013.01); *F25J 1/0052* (2013.01); *F25J 1/0097* (2013.01); *F25J 1/023* (2013.01); *F25J 1/0212* (2013.01); *F25J 1/0254* (2013.01); *F25J 1/0277* (2013.01); *F25J 1/0278* (2013.01); *F25J 1/0291* (2013.01); *F25J 2220/62* (2013.01); *F25J 2230/08* (2013.01); *F25J 2230/30* (2013.01); *F25J 2230/60* (2013.01); *F25J 2235/60* (2013.01); *F25J 2290/62* (2013.01); *Y02T 10/32* (2013.01)

(56) References Cited

U.S. PATENT DOCUMENTS

| | | | |
|---|---|---|---|
| 7,493,778 B2 * | 2/2009 | Engdahl | 62/614 |
| 8,893,515 B2 * | 11/2014 | Mak | 62/48.2 |
| 2006/0156744 A1 * | 7/2006 | Cusiter et al. | 62/50.2 |
| 2008/0276628 A1 | 11/2008 | Lee et al. | |
| 2011/0277497 A1 * | 11/2011 | Lee et al. | 62/611 |

FOREIGN PATENT DOCUMENTS

| | | |
|---|---|---|
| KR | 10-0929250 B1 | 12/2009 |
| KR | 10-2010-0021774 A | 2/2010 |
| KR | 10-2010-0099441 A | 9/2010 |
| KR | 10-2010-0136691 A | 12/2010 |
| KR | 10-2011-0023856 A | 3/2011 |
| WO | 2007/117148 A1 | 10/2007 |
| WO | 2009/136793 A1 | 11/2009 |

* cited by examiner

METHOD FOR OPERATING FUEL SUPPLY SYSTEM FOR MARINE STRUCTURE HAVING RELIQUEFACTION APPARATUS AND HIGH-PRESSURE NATURAL GAS INJECTION ENGINE

TECHNICAL FIELD

The present invention relates to a method for operating a fuel supply system for a high-pressure natural gas injection engine, and more particularly, to a method for operating a fuel supply system for a marine structure such as a liquefied natural gas (LNG) carrier having a boil-off gas (BOG) reliquefaction apparatus and a high-pressure natural gas injection engine (e.g., a MAN Electronic-Gas Injection (ME-GI) engine), which can efficiently supply fuel to the high-pressure natural gas injection engine and minimize energy consumption in the BOG reliquefaction apparatus.

BACKGROUND ART

Recently, the consumption of natural gas, such as liquefied natural gas (LNG) or liquefied petroleum gas (LPG), has been rapidly increasing throughout the world. Liquefied gas is transported in a gaseous state through onshore or offshore gas pipelines, or transported to a remote consumption place while being stored in a liquefied state inside a liquefied gas carrier. Liquefied gas, such as LNG or LPG, is obtained by cooling natural gas or petroleum gas to a cryogenic temperature (in the case of LNG, about −163° C.). Since the volume of liquefied gas is considerably reduced as compared to a gaseous state, liquefied gas is very suitable for a long-distance marine transportation A liquefied gas carrier is designed to load liquefied gas, sail across the sea, and unload the liquefied gas at an onshore consumption place. To this end, the liquefied gas carrier includes a storage tank (also called "cargo hold") that can withstand a cryogenic temperature of liquefied gas.

Examples of a marine structure provided with a storage tank capable of storing cryogenic liquefied gas may include vessels, such as a liquefied gas carrier and an LNG Regasification Vessel (LNG RV), or structures, such as an LNG Floating Storage and Regasification Unit (LNG FSRU) and an LNG Floating, Production, Storage and Off-loading (LNG FPSO).

The LNG RV is a self-propelled, floatable liquefied gas carrier equipped with an LNG regasification facility, and the LNG FSRU is a marine structure that stores LNG unloaded from an LNG carrier on the sea far away from the land and, if necessary, supplies the LNG to an offshore consumption place by gasifying the LNG. The LNG FPSO is a marine structure that refines extracted LNG on the sea, stores the LNG in a storage tank after direct liquefaction, and, if necessary, transships the LNG to an LNG carrier. The term "marine structure" as used herein is a concept including vessels, such as a liquefied gas carrier and an LNG RV, and structures, such as an LNG FPSO and an LNG FSRU.

Since the liquefaction temperature of natural gas is a cryogenic temperature of −163° C. at ambient pressure, LNG is likely to be vaporized even when the temperature of LNG is slightly higher than −163° C. at ambient pressure. In the case of a conventional LNG carrier, even though an LNG storage tank is thermally insulated, external heat is continuously transferred to LNG. Therefore, LNG is continuously vaporized and boil-off gas is generated within the LNG storage tank during the transportation of LNG by the LNG carrier.

The generated natural gas may increase the internal pressure of the storage tank and accelerate the flow of the natural gas due to the rocking of the vessel, causing structural problems. Therefore, it is necessary to suppress the generation of BOG.

Conventionally, in order to suppress the generation of BOG within the storage tank of the liquefied gas carrier, a method of discharging the BOG from the storage tank and burning the BOG, a method of discharging the BOG from the storage tank, reliquefying the BOG through a reliquefaction apparatus, and returning the BOG to the storage tank, a method of using the BOG as fuel for a vessel's propulsion engine, and a method of suppressing the generation of BOG by maintaining an internal pressure of a storage tank at a high level have been used solely or in combination.

In the case of a conventional marine structure equipped with a BOG reliquefaction apparatus, BOG inside a storage tank is discharged from the storage tank and then reliquefied through a reliquefaction apparatus in order to maintain a pressure of the storage tank at an appropriate level. In this case, before a reliquefaction process, the BOG is compressed to a low pressure of about 4 to 8 bara and then supplied to the reliquefaction apparatus. The compressed BOG is reliquefied through heat exchange with nitrogen cooled to a cryogenic temperature in the reliquefaction apparatus including a nitrogen refrigeration cycle, and the liquefied BOG is returned to the storage tank.

BOG may be compressed to a high pressure in order to increase the BOG reliquefaction efficiency. However, the LNG stored in the storage tank is maintained at an ambient pressure state, and therefore, if a pressure of the liquefied BOG is excessively high, flash gas may be generated when the BOG is returned to the storage tank. Consequently, the BOG needs to be compressed to the above-mentioned low pressure of about 4 to 8 bara, in spite of low reliquefaction efficiency.

Conventionally, as illustrated in FIG. 1, BOG generated in a storage tank, that is, NBOG, is supplied to a BOG compressor and is compressed to a low pressure of about 4 to 8 bara. Then, the low-pressure BOG is supplied to a reliquefaction apparatus using nitrogen gas as a refrigerant (the detailed description of Korean Patent Application Publication No. 10-2006-0123675 discloses that the BOG is compressed at about 6.8 bara, and the detailed description of Korean Patent Application Publication No. 10-2001-0089142 (relevant U.S. Pat. No. 6,530,241) discloses that the BOG is compressed at about 4.5 bara). Flash gas may be generated while the BOG liquefied in the reliquefaction apparatus, that is, LBOG, is returned to the storage tank. Hence, the BOG compressor necessarily compresses the BOG at a low pressure.

As a result, according to a typical BOG processing method, BOG generated in a storage tank is reliquefied through a reliquefaction apparatus and then returned to the storage tank. Till now, a basic concept for suppressing the generation of flash gas after the reliquefaction of BOG as much as possible is not to increase a pressure of BOG to be reliquefied.

A BOG reliquefaction apparatus uses a nitrogen refrigeration cycle disclosed in International Patent Publication Nos. WO 2007/117148 and WO 2009/136793 and Korean Patent Application Publication Nos. 10-2006-0123675 and 10-2001-0089142, and also uses other mixed refrigerant cycles. As described above, it is general that the conventional BOG reliquefaction apparatus reliquefies BOG by compressing the BOG to a pressure of about 4 to 8 bara. Also, it is well known in the art that it is technically inappropriate to compress BOG to a pressure higher than the above-mentioned pressure. This is because if BOG is reliquefied at a high pressure, the pressure of the BOG is lowered to about ambient pressure when the BOG is returned later to the tank, and thus, a large amount of flash gas (BOG) is generated.

Meanwhile, since the nitrogen refrigeration cycle uses nitrogen gas ($N_2$) as a refrigerant, the liquefaction efficiency is low. Also, the mixed refrigerant cycle uses a refrigerant mixed with nitrogen and hydrocarbon gases as a refrigerant, the stability is low.

More specifically, a conventional offshore LNG reliquefaction apparatus for a vessel or an offshore plant reliquefies BOG by implementing a turbo-expander-type nitrogen reverse Brayton cycle. A conventional onshore LNG liquefaction plant liquefies natural gas by implementing a Joule-Thomson refrigeration cycle using a mixed refrigerant. The nitrogen reverse Brayton cycle used for the offshore LNG liquefaction apparatus is relatively simple in the configuration of the apparatus and thus is advantageous to a limited vessel or offshore plant, but has low efficiency. The mixed-refrigerant Joule-Thomson refrigeration cycle used for the onshore LNG liquefaction plant has relatively high efficiency but is complicated in the configuration of the apparatus because a separator needs to be used for separating a mixed refrigerant when a gaseous state and a liquid state coexist due to the feature of the mixed refrigerant. However, such a reliquefaction method has still been widely used.

Moreover, in the case of a marine structure equipped with a storage tank configured to store liquefied gas such as LNG, there is a need for extensive research and development of methods for efficiently processing BOG continuously generated in a storage tank and suppressing the generation of flash gas.

DISCLOSURE

Technical Problem

An aspect of the present invention is directed to a method for operating a fuel supply system. Specifically, BOG generated in a liquefied gas storage tank is used as fuel for a high-pressure natural gas injection engine (e.g., an ME-GI engine). The BOG is compressed to a medium pressure higher than a conventional pressure, reliquefied, and then supplied to the high-pressure natural gas injection engine. A recondenser is installed, and a portion of the generated BOG is recondensed by the recondenser to reduce a load on an reliquefaction apparatus. Accordingly, fuel can be efficiently supplied to the high-pressure natural gas injection engine, and the energy consumption of the reliquefaction apparatus can be minimized.

The applicant of the present patent application developed a fuel supply technology in which LNG was compressed (pumped) by a high-pressure pump, gasified and then supplied as fuel, instead of fuel supply by gas compression, which was proposed by MAN B&W Diesel Ltd as a conventional fuel supply method for a high-pressure gas injection engine. The applicant of the present patent application filed a patent application in Korea on May 8, 2007 (Korean Patent Application No. 10-2007-0044727), and this technology made a great apple to ship owners and MAN B&W Diesel Ltd.

Hamworthy Gas Systems slightly modified the above-described technology proposed by the applicant of the present patent application and filed an international patent application (International Patent Publication No. WO 2009/136793). However, even after the development of such technology, there was a concern in the art about the generation of flash gas when liquefied BOG is returned to a storage tank. Therefore, when BOG was reliquefied, the BOG was compressed in a low pressure range (4 to 8 bara), and the compression of BOG at a pressure higher than the above-mentioned pressure range has not been considered at all.

When actually applying the basic technology for high-pressure pumping of LNG, the applicant of the present patent application found, in the process of developing the technology for using BOG generated in an LNG storage tank as fuel, that unlike the conventional reliquefaction technology for reliquefying BOG by compressing the BOG to a pressure of 4 to 8 bara, energy consumed in the reliquefaction was considerably reduced if BOG was compressed in a medium pressure range (12 to 45 bara) higher than a conventional reliquefaction pressure and then reliquefied. Based on such discovery, the applicant of the present patent application completed the present invention.

Also, the applicant of the present patent application found that the present invention had advantages that could reduce power consumption of a high-pressure pump configured to compress LNG, which was compressed in a medium pressure range after reliquefaction, to a high pressure, as well as the considerable reduction in the reliquefaction energy. Moreover, the applicant of the present patent application found that the present invention had advantages in that subcooling needed not be performed because BOG was compressed by the high-pressure pump after the reliquefaction.

The objects and effects of the present invention are disclosed herein for the first time.

Technical Solution

According to an embodiment of the present invention, a method for operating a fuel supply system to supply fuel to a high-pressure natural gas injection engine, the fuel supply system including a boil-off gas (BOG) compression unit configured to receive and compress BOG generated in a storage tank, a reliquefaction apparatus configured to receive and liquefy the BOG compressed by the BOG compression unit, a high-pressure pump configured to compress the liquefied BOG generated by the reliquefaction apparatus, and a high-pressure gasifier configured to gasify the liquefied BOG compressed by the high-pressure pump, wherein the fuel supply system comprises a recondenser installed at an upstream side of the high-pressure pump, and the recondenser recondenses a portion or all of the generated BOG by using liquefied gas supplied from the storage tank, wherein during a ballast voyage process, all of the BOG is supplied to and recondensed by the recondenser, and an operation of the reliquefaction apparatus is interrupted.

According to the fuel supply system operating method, liquefied natural gas (LNG) stored in the storage tank may be supplied through an LNG supply line to the recondenser.

According to the fuel supply system operating method, BOG discharged from the storage tank may be compressed to about 12 to 45 bara and then is supplied to the recondenser.

According to the fuel supply system operating method, when the storage tank is laden with liquefied gas cargo, BOG naturally generated in the storage tank may be supplied to and reliquefied by the reliquefaction apparatus.

According to the fuel supply system operating method, a portion of the BOG generated in the storage tank may be bypassed through a BOG bypass line to the recondenser to reduce a reliquefaction load on the reliquefaction apparatus.

According to the fuel supply system operating method, a booster pump may be installed between the recondenser and the high-pressure pump.

According to the fuel supply system operating method, LNG stored in the storage tank may be supplied to the recondenser by a submerged pump located in the storage tank.

According to the fuel supply system operating method, LNG discharged from the storage tank may be compressed by a booster pump to a pressure equal to an internal pressure of the recondenser and then supplied to the recondenser.

According to the fuel supply system operating method, the BOG compressed by the BOG compression unit and the liquefied BOG compressed by the high-pressure pump may exchange heat with each other in a heat exchanger, so that the BOG may cooled and supplied to at least one of the reliquefaction apparatus and the recondenser, and the liquefied BOG may be heated and supplied to the high-pressure gasifier.

A fuel supply method according to the fuel supply system of the present invention may reduce BOG liquefaction energy because the BOG recycles liquefaction energy of the liquefied BOG by heat exchange between the BOG before liquefaction and the liquefied BOG before gasification. Also, before compressing the BOG generated in the liquefied gas storage tank, the BOG generated in the storage tank may be preheated by heat exchange with the compressed BOG or the nitrogen refrigerant heated in the nitrogen refrigeration cycle of the reliquefaction apparatus. The cold heat recovery or the preheating of the BOG may use the technologies disclosed in International Patent Publication Nos. WO 2007/117148 and WO 2009/136793, Korean Patent Application Publication No. 10-2006-0123675, and Korean Patent Registration No. 0929250. Although the cold heat recovery from the liquefied BOG is described in the present disclosure, LNG stored in an LNG storage tank may be used when an amount of liquefied BOG is smaller than an amount of fuel required in a high-pressure natural gas injection engine. In this case, the cold heat may be recovered from the LNG supplied from the LNG storage tank.

Examples of the marine structure may include vessels, such as a liquefied gas carrier and an LNG RV, or structures, such as an LNG FSRU and an LNG FPSO.

The fuel supply method may supply all of the liquefied BOG to the high-pressure natural gas injection engine during the fuel supply. That is, the high-pressure natural gas injection engine may require a larger amount of fuel than an amount of the BOG generated in the LNG storage tank for a considerable period of time during the voyage of the marine structure. In this case, all of the liquefied BOG is supplied to the high-pressure natural gas injection engine, thereby preventing the generation of flash gas when the liquefied BOG is returned to the LNG storage tank.

According to another aspect of the present invention, when the high-pressure natural gas injection engine requires a larger amount of fuel than an amount of BOG generated in the LNG storage tank during the voyage of the marine structure, all or a considerable amount of the BOG may be supplied to the high-pressure natural gas injection engine. In this case, if an amount of fuel is insufficient, the LNG stored in the LNG storage tank may be used as fuel.

Advantageous Effects

The present invention may provide a method for operating a fuel supply system for a high-pressure natural gas injection engine. Specifically, BOG generated in a liquefied gas storage tank is used as fuel for a high-pressure natural gas injection engine (e.g., an ME-GI engine). The BOG is compressed to a medium pressure higher than a conventional pressure, reliquefied, and then supplied to the high-pressure natural gas, injection engine. A recondenser is installed, and a portion of the generated BOG is recondensed by the recondenser to reduce a load on a reliquefaction apparatus.

According to the fuel supply system operating method for the high-pressure natural gas injection engine according to the present invention, fuel can be efficiently supplied to the high-pressure natural gas injection engine, and the energy consumption of the reliquefaction apparatus can be minimized.

As opposed to the related art in which the BOG is compressed to a low pressure of about 4 to 8 bara, the fuel supply system for the high-pressure natural gas injection engine according to the present invention compresses the BOG to a medium pressure of about 12 to 45 bara and then reliquefied. As the pressure of the BOG increases, the liquefaction energy decreases. Therefore, the liquefaction energy consumed in reliquefaction may be reduced.

Also, in the fuel supply system for the high-pressure natural gas injection engine according to the present invention, since the pressure of the BOG in the BOG reliquefaction is a medium pressure higher than that of the related art, the liquefying point of the BOG increases. Therefore, thermal stress applied to a heat exchanger for reliquefaction is reduced, and a heat duty of a high-pressure gasifier is reduced, leading to a reduction in the size of the apparatus.

Also, since the liquefied BOG compressed to a medium pressure is compressed to a high pressure, power of a high-pressure pump is reduced.

Also, in the fuel supply system for the high-pressure natural gas injection engine according to the present invention, a nonflammable mixed refrigerant is used as a refrigerant of a reliquefaction apparatus for the BOG reliquefaction. Therefore, the fuel supply method according to the present invention is more efficient than a conventional nitrogen refrigeration cycle, and can reliquefy the BOG more safely than a conventional mixed refrigerant cycle.

The fuel supply method according the fuel supply system may supply all of the liquefied BOG to the high-pressure natural gas injection engine during the operation of the high-pressure natural gas injection engine. That is, the high-pressure natural gas injection engine may require a larger amount of fuel than an amount of the BOG generated in the LNG storage tank for a considerable period of time during the voyage of the marine structure. In this case, all of the liquefied BOG is supplied to the high-pressure natural gas injection engine, thereby preventing the generation of flash gas when the liquefied BOG is returned to the LNG storage tank. Also, it is possible to considerably reduce energy that is consumed by subcooling for reducing the generation of flash gas when the liquefied BOG is returned to the LNG storage tank. A conventional Mark III reliquefaction apparatus of Hamworthy Gas Systems (the technology disclosed in International Patent Publication No. WO 2007/117148) compresses the BOG to a pressure of 8 bara and liquefies the BOG at a temperature of −159° C. In this case, since the saturation temperature of the BOG is about −149.5° C., the BOG is subcooled by about 9 to 10° C. The BOG needs to be subcooled by such a degree in order to prevent the generation of flash gas when the liquefied BOG is returned to the LNG storage tank. However, since the liquefied BOG is compressed by the high-pressure pump while the liquefied BOG is supplied as fuel for the high-pressure natural gas injection engine, the LBOG saturated by the increased pressure can stably maintain the overcooled state later. Therefore, according to the present invention, the liquefied BOG may be liquefied by overcooling as much as 0.5 to 3° C., preferably about 1° C., as compared to the saturation temperature at the corresponding pressure, and then supplied as fuel.

Also, in the fuel supply system for the high-pressure natural gas injection engine according to the present invention, if necessary, the DFDE may be mounted such that fuel remaining after fuel supply to the high-pressure natural gas injection engine or flash gas generated during decompression is consumed while being used as the fuel of the DFDE. That is, BOG exceeding the amount of fuel required by the high-pressure natural gas injection engine may be compressed to a pressure of about 4 to 8 bara and directly supplied from the LNG storage tank to the DFDE without medium-pressure reliquefaction.

DETAILED DESCRIPTION OF EXEMPLARY EMBODIMENTS

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The International Maritime Organization (IMO) regulates the emission of nitrogen oxides ($NO_x$) and sulfur oxides ($SO_x$) among exhaust gases of ships and also tries to regulate the emission of carbon dioxide ($CO_2$). In particular, the issue of the regulation of nitrogen oxides ($NO_x$) and sulfur oxides ($SO_x$) was raised by the Prevention of Marine Pollution from Ships (MARPOL) protocol in 1997. After eight long years, the protocol met effectuation requirements and entered into force in May 2005. Currently, the regulation is in force as a compulsory provision.

Therefore, in order to meet such a provision, a variety of methods have been introduced to reduce the emission of nitrogen oxides ($NO_x$). As one of these methods, a high-pressure natural gas injection engine for an LNG carrier, for example, an ME-GI engine, has been developed and used.

Such an ME-GI engine may be installed in a marine structure such as an LNG carrier which transports LNG while storing the LNG in a storage tank capable of withstanding a cryogenic temperature. The term "marine structure" as used herein includes vessels, such as an LNG carrier and an LNG RV, and offshore plants, such as an LNG FPSO and an LNG FSRU. In this case, the ME-GI engine uses natural gas as fuel and requires a high pressure of about 150 to 400 bara (absolute pressure) for gas supply, depending on a load thereof.

Even in the case of a marine structure equipped with a high-pressure natural gas injection engine such as an ME-GI engine, a reliquefaction apparatus is still required for processing BOG generated in an LNG storage tank. A conventional marine structure equipped with both the high-pressure natural gas injection engine such as an ME-GI engine and the reliquefaction apparatus for processing the BOG can select whether to use BOG as fuel or to use heavy fuel oil (HFO) as fuel while reliquefying BOG and transferring the liquefied BOG to a storage tank, depending on the change in gas and fuel oil prices and the intensity of regulation of exhaust gases. In particular, when passing through an area of the sea which is specially regulated, the marine structure can be fueled by simply gasifying LNG. In addition, the marine structure is considered as a next-generation environment-friendly engine and has an efficiency of up to 50%. Therefore, it is expected that the marine structure will be used as a main engine of an LNG carrier in the near future.

Figure 1:
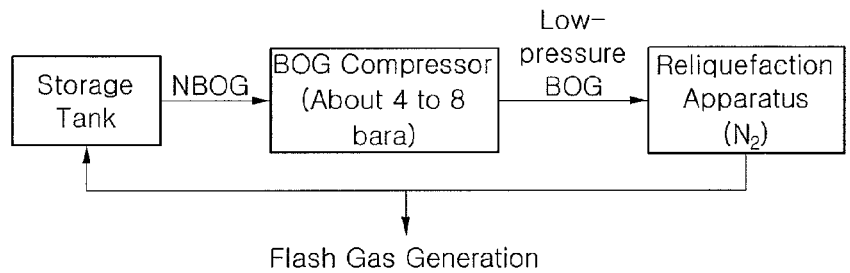
FIG. 1 is a schematic block diagram illustrating a method for processing BOG through BOG reliquefaction according to the related art.
Figure 2:
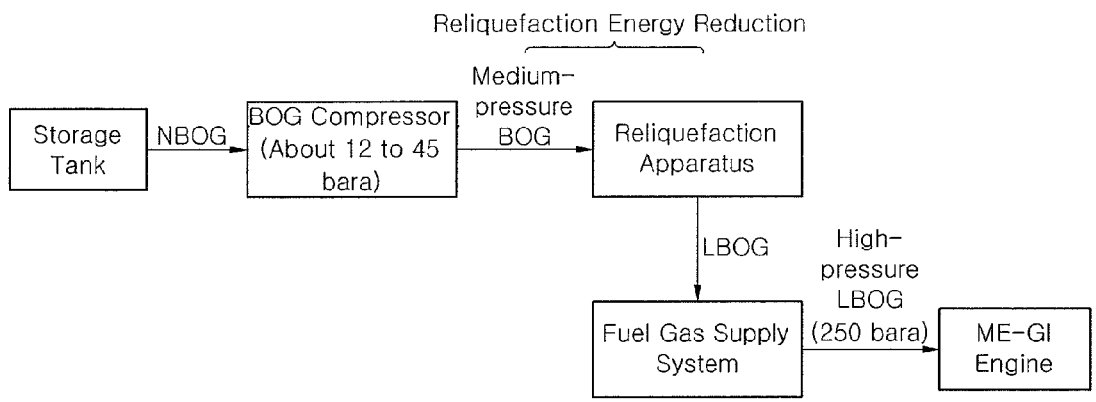
FIG. 2 is a schematic block diagram illustrating a method for processing BOG through fuel supply according to the present invention.

FIG. 2 is a schematic block diagram illustrating a fuel supply method according to the present invention. According to the fuel supply method of the present invention, BOG generated in a storage tank, that is, NBOG is supplied to a BOG compressor and then compressed to a medium pressure of about 12 to 45 bara. Then, the medium-pressure BOG is supplied to a reliquefaction apparatus using a mixed refrigerant (e.g., a nonflammable mixed refrigerant, a single mixed refrigerant (SMR), etc.) or nitrogen gas as a refrigerant. BOG reliquefied in the reliquefaction apparatus, that is, LBOG, is compressed in a fuel supply system to a pressure required by an ME-GI engine (for example, a high pressure of about 400 bara) and then supplied to the ME-GI engine as fuel. According to the present invention, since the LBOG supplied from the reliquefaction apparatus to the fuel supply system is not returned to the storage tank, it is possible to prevent the generation of flash gas, which is a problem of the related art. Therefore, the BOG compressor may compress the BOG to a medium pressure.

In the present specification, the "high pressure" range represents a pressure of about 150 to 400 bara, which is a fuel supply pressure required by the high-pressure natural gas injection engine. The "medium pressure" range represents a pressure of about 12 to 45 bara, at which the BOG compressor 13 compresses BOG. The "low pressure" range represents a pressure of about 4 to 8 bara, at which BOG is compressed for supply to the reliquefaction apparatus in the related art.

Figure 6A:
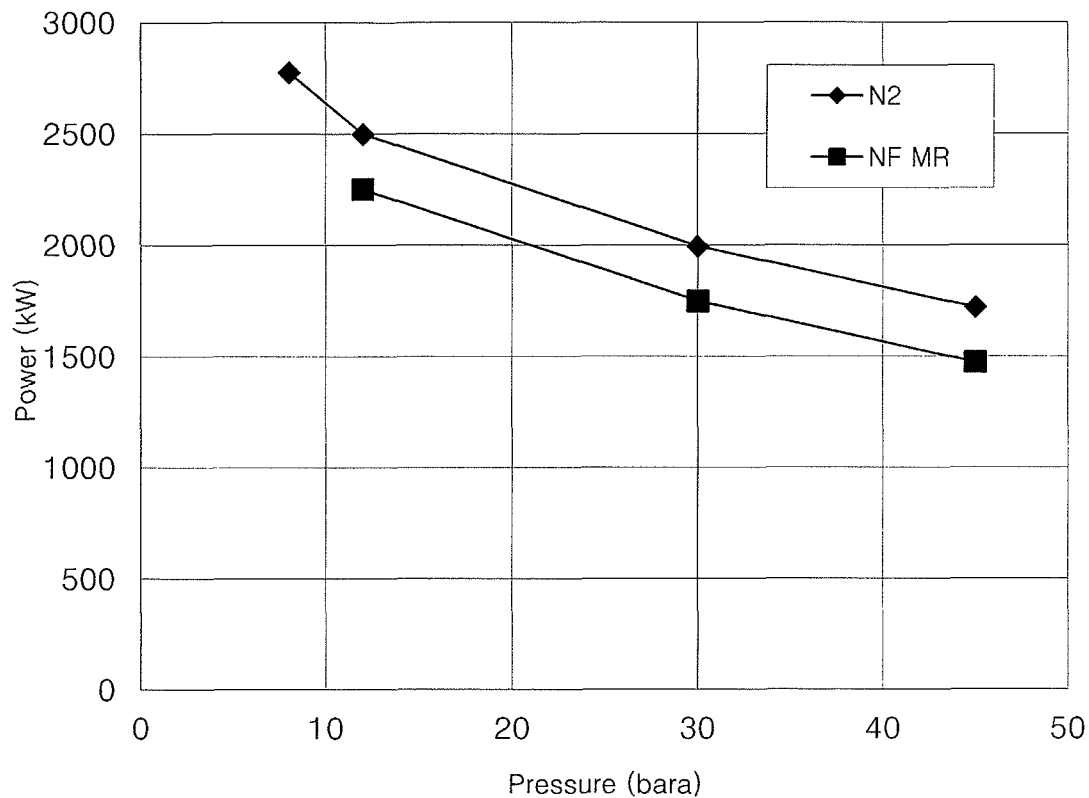
FIGS. 6A to 6C are graphs illustrating the comparison of power consumptions in cases where a BOG reliquefaction apparatus uses a nitrogen gas refrigeration cycle, a nonflammable mixed refrigerant refrigeration cycle, and a single mixed refrigerant (SMR) refrigeration cycle.
Figure 6B:
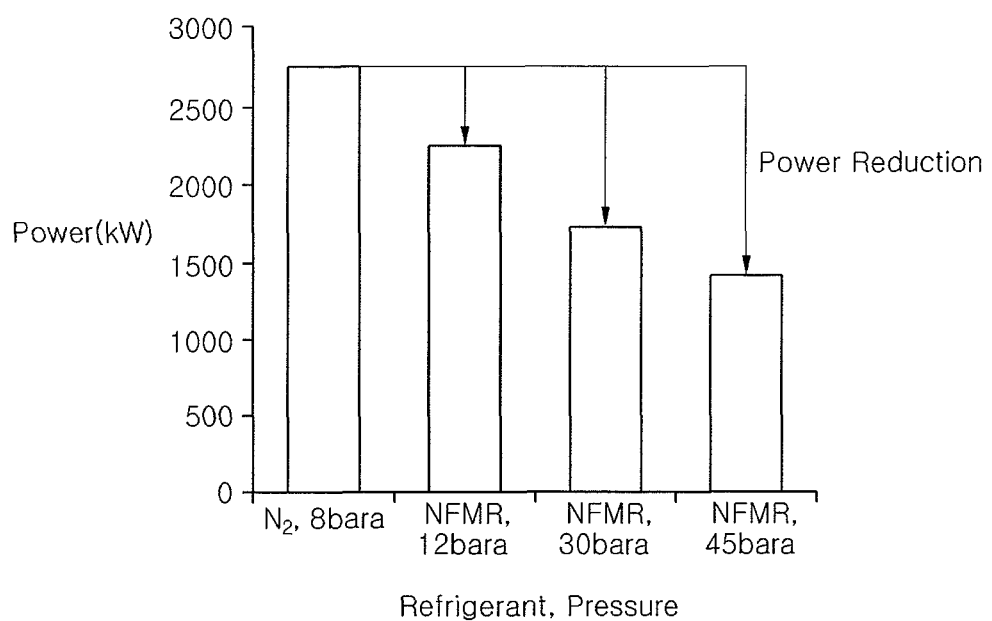
Figure 6C:
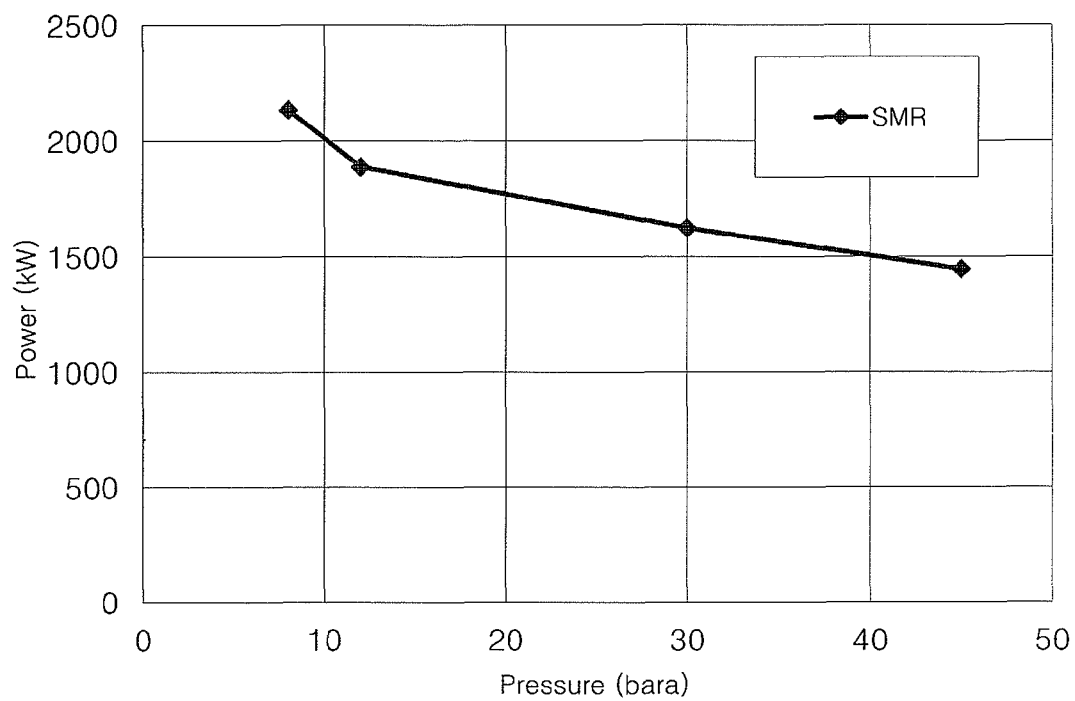

As compared to the conventional low-pressure reliquefaction, the reliquefaction after compression in the medium pressure range results in considerable reliquefaction energy reduction in the cases of FIGS. 6A and 6B, in which a nitrogen refrigerant and a nonflammable mixed refrigerant are used, and the case of FIG. 6C, in which an SMR is used.

Data shown in FIGS. 6A and 6B are results obtained using a Hysys process model (manufactured by Aspentech). As can be seen from these results, in the case of a Mark III reliquefaction apparatus of Hamworthy Gas Systems which uses nitrogen gas as a refrigerant (the technology disclosed in International Patent Publication No. WO 2007/117148), power consumption required for reliquefaction is about 2,776 kW when the pressure of the BOG compressor is 8 bara, but power consumption required for reliquefaction is rapidly reduced to 2,500 kW when the pressure of the BOG compressor increases to 12 bara. Also, when the pressure of the BOG compressor is 12 bara or more, power consumption required for reliquefaction is gradually reduced.

A graph of FIG. 6C illustrates a variation in power consumption when a hydrocarbon SMR is used as a refrigerant. As can be seen from the result of FIG. 6C, even when the SMR is used as a refrigerant, power consumption required for reliquefaction is rapidly reduced in the case where the pressure of the BOG compressor is 12 bara, as compared to the case where the pressure of the BOG compressor is 8 bara. Also, when the pressure of the BOG compressor is 12 bara or more, power consumption required for reliquefaction is gradually reduced.

The composition of the SMR by liquefaction pressure was adjusted for efficiency optimization, as shown in Table 1 below.

TABLE 1

| | Refrigerant Composition (mol %) | | | |
|---|---|---|---|---|
| | 8 bara | 12 bara | 30 bara | 45 bara |
| Nitrogen | 11.91 | 5.55 | 0.00 | 0.00 |
| Methane | 45.11 | 48.54 | 45.81 | 36.63 |
| Ethane | 17.68 | 18.66 | 22.84 | 30.74 |
| Propane | 10.57 | 11.30 | 13.70 | 13.05 |
| i-Pentane | 14.74 | 15.95 | 17.65 | 19.58 |

In the case of the reliquefaction apparatus using the non-flammable mixed refrigerant described herein (NFMR, composition of Table 4 below), energy required for reliquefaction is further reduced than the case of the reliquefaction apparatus using the nitrogen refrigerant.

According to the present invention, the preferable pressure range of the BOG is a medium pressure range of about 12 to 45 bara. A pressure of 12 bara or less is not preferable because power consumption required for reliquefaction is not greatly reduced. Also, a pressure higher than 45 bara is not preferable because energy required for reliquefaction is not greatly reduced.

(First Embodiment)

Figure 3A:
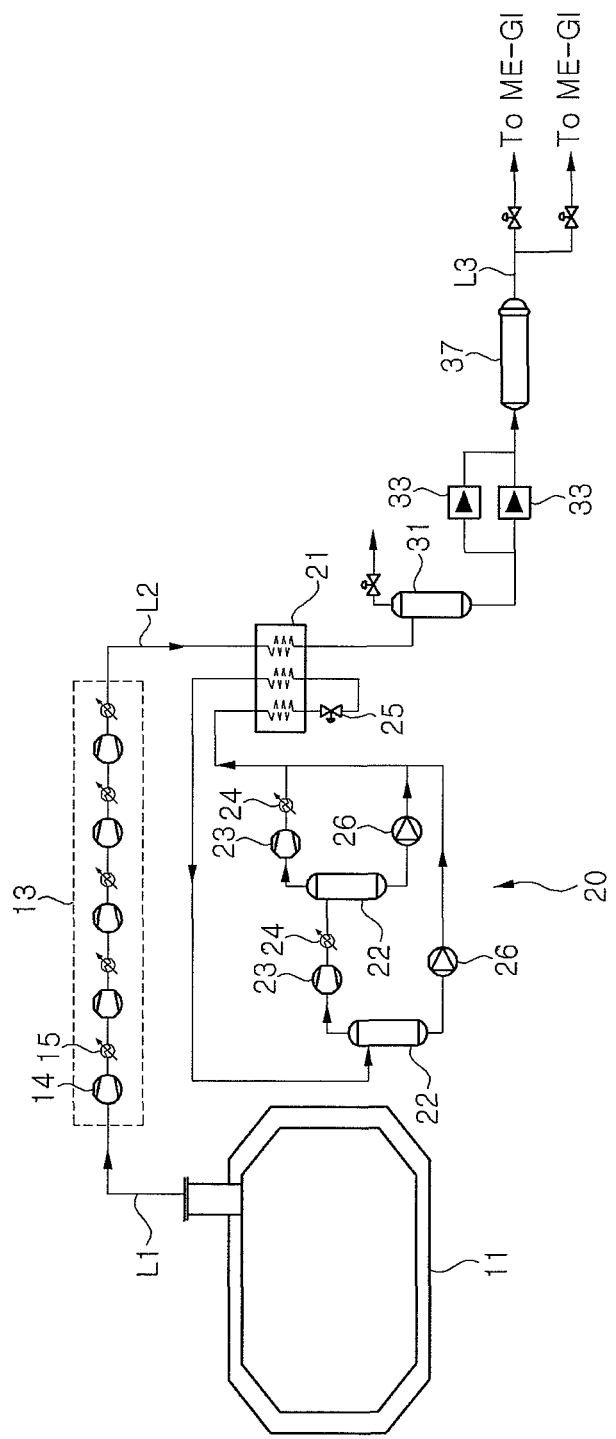
FIG. 3A is a configuration diagram illustrating a fuel supply system for a high-pressure natural gas injection engine according to a first embodiment of the present invention.

FIG. 3A is a configuration diagram illustrating a fuel supply system for a marine structure such as an LNG carrier having a high-pressure natural gas injection engine, for example, an ME-GI engine, according to a first embodiment of the present invention. FIG. 3A illustrates an example in which the fuel supply system for the high-pressure natural gas injection engine according to the present invention is applied to the LNG carrier equipped with the ME-GI engine capable of using natural gas as fuel. However, the fuel supply system for the high-pressure natural gas injection engine according to the present invention may also be applied to any type of marine structures equipped with a liquefied gas storage tank. Examples of the marine structures may include vessels, such as an LNG carrier and an LNG RV, and offshore plants, such as an LNG FPSO and an LNG FSRU.

According to the fuel supply system for the marine structure having the high-pressure natural gas injection engine according to the first embodiment of the present invention, NBOG generated in and discharged from a liquefied gas storage tank 11 is compressed to a medium pressure of about 12 to 45 bara (absolute pressure) by a BOG compression unit 13 and then supplied to a reliquefaction apparatus 20. LBOG reliquefied in the reliquefaction apparatus 20 by receiving reliquefaction energy (i.e., cold heat) is compressed to a high pressure of about 150 to 400 bara by a high-pressure pump 33 and then supplied to a high-pressure gasifier 37. Then, the LBOG is gasified by the high-pressure gasifier 37 and then supplied as fuel to the high-pressure natural gas injection engine, for example, the ME-GI engine.

Since the liquefied BOG (i.e., LNG) compressed to a high pressure by the high-pressure pump 33 is in a supercritical pressure state, it is actually difficult to distinguish a liquid phase from a gaseous phase. In the present specification, heating the liquefied BOG to ambient temperature (or temperature required in the high-pressure natural gas injection engine) in a high-pressure state is referred to as gasification, and a unit configured to heat the liquefied BOG to ambient temperature in a high-pressure state is referred to as a high-pressure gasifier.

The storage tank includes a sealing and insulating barrier to store liquefied gas such as LNG in a cryogenic state. However, the storage tank cannot completely interrupt heat transmitted from the outside. Accordingly, liquefied gas is continuously boiled off in the storage tank 11. In order to maintain the pressure of BOG in the storage tank 11, at a suitable level, the BOG is discharged through a BOG discharge line L1.

The discharged BOG is supplied to the BOG compression unit 13 through the BOG discharge line L1. The BOG compression unit 13 includes one or more BOG compressors 14 and one or more intermediate coolers 15 configured to cool the BOG, a temperature of which increases while being compressed by the BOG compressors 14. A five-stage BOG compression unit 13 including five BOG compressors 14 and five intermediate coolers 15 is exemplarily illustrated in FIG. 3A.

The BOG compressed by the BOG compression unit 13 is supplied to the reliquefaction apparatus 20 through a BOG supply line L2. The BOG supplied to the reliquefaction apparatus 20 is cooled and reliquefied by a refrigerant while passing through a cold box 21 of the reliquefaction apparatus 20. The reliquefaction apparatus 20 may have any configuration as long as the reliquefaction apparatus 20 can liquefy BOG generated from the liquefied gas such as LNG.

The BOG reliquefied through heat exchange in the cold box 21 is separated into a gaseous state and a liquid state in a buffer tank 31. Only the liquefied BOG of a liquid state is supplied to the high-pressure pump 33 through a fuel supply line L3. A plurality of high-pressure pump 33 (for example, two high-pressure pumps) may be installed in parallel.

The high-pressure pump 33 compresses the liquefied BOG to a fuel supply pressure required in the high-pressure natural gas injection engine (e.g., an ME-GI engine). The liquefied BOG supplied from the high-pressure pump 33 has a high pressure of about 150 to 400 bara (absolute pressure).

The reliquefaction apparatus 20 exemplarily illustrated in FIG. 3A includes a cold box 21 configured to reliquefy BOG through heat exchange with a refrigerant, one or more gas-liquid refrigerant separators 22 configured to separate a refrigerant, which is heated and partially gasified by the cold box 21, into a gaseous refrigerant and a liquid refrigerant, one or more refrigerant compressors 23 configured to compress the gaseous refrigerant separated by the gas-liquid refrigerant separators 22, a refrigerant cooler 24 configured to cool the refrigerant compressed by the refrigerant compressors 23, a refrigerant expansion valve 25 configured to drop the temperature of the refrigerant by expanding the refrigerant compressed by the refrigerant compressors 23 and cooled by the refrigerant cooler 24, and a refrigerant pump 26 configured to supply the liquid refrigerant separated by the gas-liquid refrigerant separators 22 to the refrigerant expansion valve 25.

The refrigerant supplied to the refrigerant expansion valve 25 through the refrigerant pump 26 may be mixed with the refrigerant supplied to the refrigerant expansion valve 25 after passing through the refrigerant cooler 24 in an upstream side of the refrigerant expansion valve 25.

Meanwhile, the refrigerant supplied to the refrigerant expansion valve 25 may exchange heat with the refrigerant that passes through the cold box 21 before expansion and has a cryogenic state after expansion.

In addition, the refrigerant cooled by the refrigerant cooler 24 may be supplied to another gas-liquid refrigerant separator and separated into a gaseous refrigerant and a liquid refrigerant. To this end, although the liquefaction apparatus 20 including two gas-liquid refrigerant separators 22, two refrigerant compressors 23, two refrigerant coolers, and two refrigerant pumps 26 is exemplarily illustrated in FIG. 3A, the present invention is not limited thereto. The number of the respective components included in the liquefaction apparatus 20 may be increased or decreased, depending on a design thereof.

(Modified Example of First Embodiment)

Figure 3B:
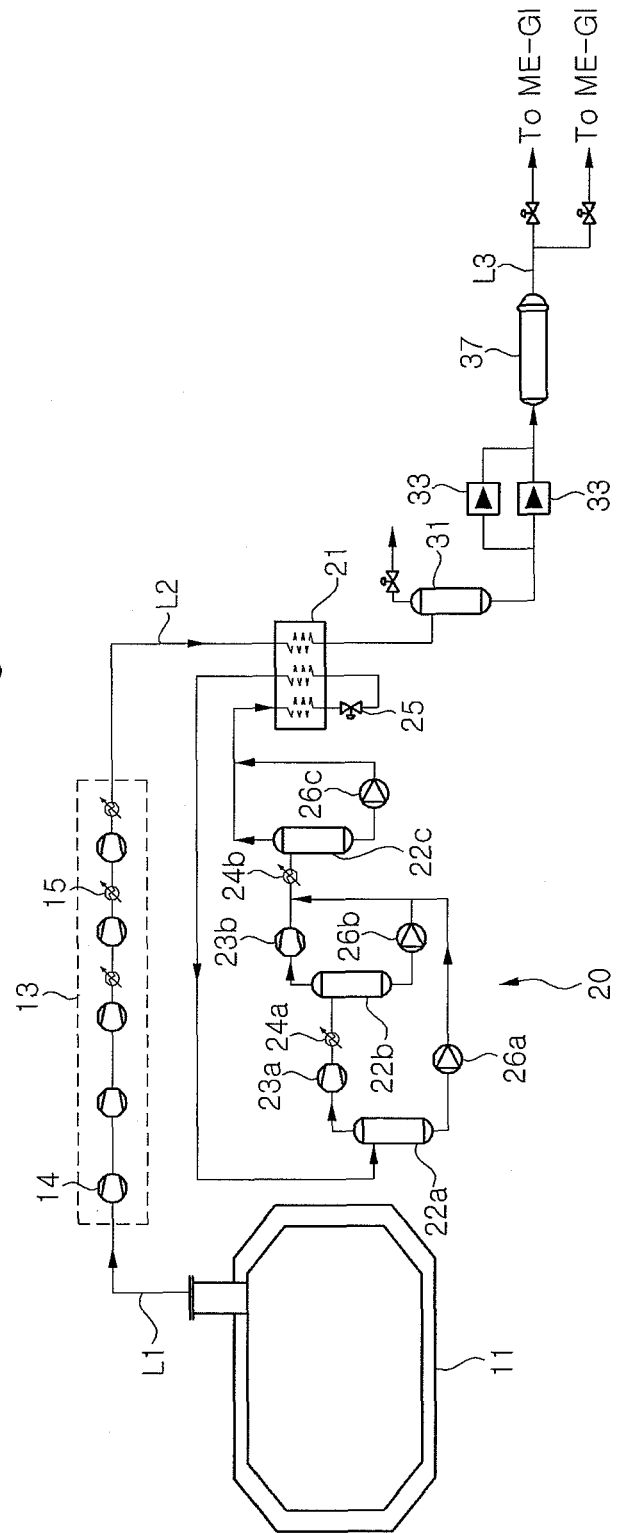
FIG. 3B is a configuration diagram illustrating a fuel supply system for a high-pressure natural gas injection engine according to a modified example of the first embodiment of the present invention.

FIG. 3B illustrates a fuel supply system according to a modified example of the first embodiment of the present invention. Since the modified example of the first embodiment is partially different from the first embodiment in terms of the configurations of a BOG compression unit 13 and a liquefaction apparatus 20, only the difference therebetween will be described below.

The modified example of the first embodiment illustrated in FIG. 3B is substantially identical to the first embodiment illustrated in FIG. 3A in that the BOG compressing unit 13 includes five BOG compressors 14, but is different from the first embodiment in that an intermediate cooler 15 is not disposed between the first and second BOG compressors and between the second and third BOG compressors included in the BOG compression unit 13. According to the present invention, the intermediate cooler 15 may or may not be disposed between every two BOG compressors 14.

Also, the liquefaction apparatus 20 according to the modified example of the first embodiment illustrated in FIG. 3B includes a cold box 21 configured to exchange heat between a refrigerant and BOG, a compression unit configured to compress a refrigerant that is heated and at least gasified by the cold box 21, and an expansion unit configured to expand the compressed refrigerant to drop the temperature thereof.

More specifically, the liquefaction apparatus 20 according to the modified example of the first embodiment illustrated in FIG. 3B includes a cold box 21 configured to reliquefy BOG by heat exchange between a refrigerant and BOG, a first gas-liquid refrigerant separator 22a configured to separate the refrigerant, which is heated and partially gasified by the cold box 21, into a gaseous refrigerant and a liquid refrigerant, a first refrigerant compressor 23a configured to compress the gaseous refrigerant separated by the first gas-liquid refrigerant separator 22a, a first refrigerant cooler 24a configured to cool the refrigerant compressed by the first refrigerant compressor 23a, a second gas-liquid refrigerant separator 22b configured to secondarily separate the refrigerant, which is cooled by the first refrigerant cooler 24a, into a gaseous refrigerant and a liquid refrigerant, a second refrigerant compressor 23b configured to compress the gaseous refrigerant separated by the second gas-liquid refrigerant separator 22b, a second refrigerant cooler 24b configured to cool the refrigerant compressed by the second refrigerant compressor 23b, a first refrigerant pump 26a configured to supply the liquid refrigerant, which is separated by the first gas-liquid refrigerant separator 22a, to the second refrigerant cooler 24b, a second refrigerant pump 26b configured to supply the liquid refrigerant, which is separated by the second gas-liquid refrigerant separator 22b, to the second refrigerant cooler 24b, a third gas-liquid refrigerant separator 22c configured to tertiarily separate the refrigerant, which is cooled by the second refrigerant cooler 24b, into a gaseous refrigerant and a liquid refrigerant, a refrigerant expansion valve 25 configured to expand the liquid refrigerant separated by the third gas-liquid refrigerant separator 22c to drop the temperature thereof, and a third refrigerant pump 26c configured to supply the liquid refrigerant from the third gas-liquid refrigerant separator 22c to the refrigerant expansion valve 25.

The liquid refrigerants supplied from the first and second gas-liquid refrigerant separators 22a and 22b to the second refrigerant cooler 24b may be joined together. Then, the joined refrigerants may be mixed with the gaseous refrigerant supplied from the second refrigerant compressor 23b to the second refrigerant cooler 24b and then be supplied to the second refrigerant cooler 24b. In addition, the gaseous refrigerant separated by the third gas-liquid refrigerant separator 22c may be mixed with the liquid refrigerant supplied to the refrigerant expansion valve 25 by the third refrigerant pump 26c. Moreover, the refrigerant supplied to the refrigerant expansion valve 25 may exchange heat with the refrigerant that passes through the cold box 21 before expansion and has a cryogenic state after expansion.

The reliquefaction apparatus 20 of FIG. 3B is merely exemplary and does not limit the present invention. The configuration of the reliquefaction apparatus, if necessary, may be modified depending on a design thereof.

(Nonflammable Mixed Refrigerant)

According to the present invention, as the refrigerant circulating within the reliquefaction apparatus 20, a nonflammable mixed refrigerant including R14 may be used, as opposed to the related art. The nonflammable mixed refrigerant prepared by mixing a plurality of nonflammable refrigerants has a mixture composition ratio such that the refrigerant is not condensed even at a liquefaction temperature when BOG compressed to a medium pressure is reliquefied.

A refrigeration cycle using a phase change of the mixed refrigerant has higher efficiency than a nitrogen refrigeration cycle using only nitrogen as a refrigerant. A conventional mixed refrigerant has a safety problem because a flammable refrigerant is mixed therein. However, the nonflammable mixed refrigerant according to the present invention has high safety because the nonflammable mixed refrigerant is prepared by mixing nonflammable refrigerants.

The nonflammable mixed refrigerant according to the present invention may make it possible to apply a mixed-refrigerant Joule-Thomson refrigeration cycle to an offshore LNG reliquefaction apparatus. Meanwhile, it is known that the mixed refrigerant is used in a conventional onshore LNG liquefaction plant. Since such a mixed refrigerant is an explosive hydrocarbon (HC) mixed refrigerant, it has been difficult to treat the mixed refrigerant. However, the nonflammable mixed refrigerant according to the present invention is non-explosive because the nonflammable mixed refrigerant includes argon, a hydrofluorocarbon (HFC) refrigerant, and a fluorocarbon (FC) refrigerant.

As the HFC/FC refrigerants, refrigerants listed in Table 2 below may be used. In Table 2 below, argon is also added.

TABLE 2

| Refrigerant No. | Chemical Formula | Mole. weight | Boiling Point (NBP)(° C.) |
|---|---|---|---|
| Ar | Ar | 39.95 | −185.9 |
| R14 | CF4 | 88 | −128.1 |
| R23 | CHF3 | 70.01 | −82.1 |
| R116 | CF3CF3 | 138.01 | −78.2 |
| R41 | CH3F | 34.03 | −78.1 |
| R32 | CH2F2 | 52.02 | −51.7 |
| R125 | CHF2CF3 | 120.02 | −48.1 |
| R143a | CH3CF3 | 84.04 | −47.2 |
| R161 | CH3CHF2 | 48.06 | −37.1 |
| R218 | CF3CF2CF3 | 188.02 | −36.6 |
| R134a | CH2FCF3 | 102.03 | −26.1 |
| R152a | CH3CHF2 | 66.05 | −24 |
| R227ea | CF3CHFCF3 | 170.03 | −15.6 |
| R236fa | CF3CH2CF3 | 152.04 | −1.4 |
| R245fa | CHF2CH2CF3 | 134.05 | 15.1 |

In addition to the refrigerants listed in Table 2 above, refrigerants prepared by mixing these refrigerants may be used, with separate refrigerant numbers (R400 and R500) assigned thereto. These HFC/FC mixed refrigerants are listed in Table 3 below.

TABLE 3

| Refrigerant No. | Chemical Formula (mass ratio) | Mole. weight | Boiling Point (NBP)(° C.) |
|---|---|---|---|
| R410A | R32/125(50/50) | 72.58 | −51.6 |
| R410B | R32/125(45/55) | 75.57 | −51.5 |
| R507 | R125/143a(50/50) | 98.86 | −47.1 |
| R407B | R32/125/134a(10/70/20) | 102.94 | −46.8 |
| R404A | R125/143a/134a(44/52/4) | 97.6 | −46.6 |
| R407A | R32/125/134a(20/40/40) | 90.11 | −45.2 |
| R407C | R32/125/134a(23/25/52) | 86.2 | −43.8 |
| R407E | R32/125/134a(25/15/60) | 83.78 | −42.8 |
| R407D | R32/125/134a(15/15/70) | 90.96 | −39.4 |

Figure 4A:
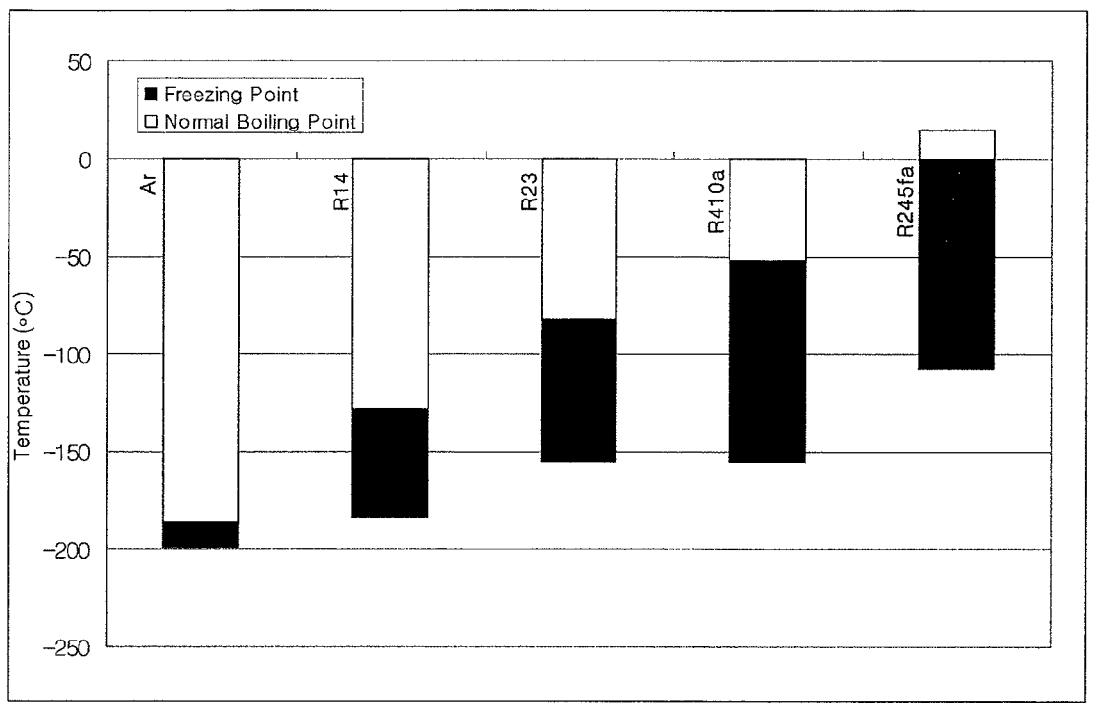
FIG. 4A is a graph illustrating the freezing points and boiling points of components contained in a nonflammable mixed refrigerant according to the present invention.
Figure 4B:
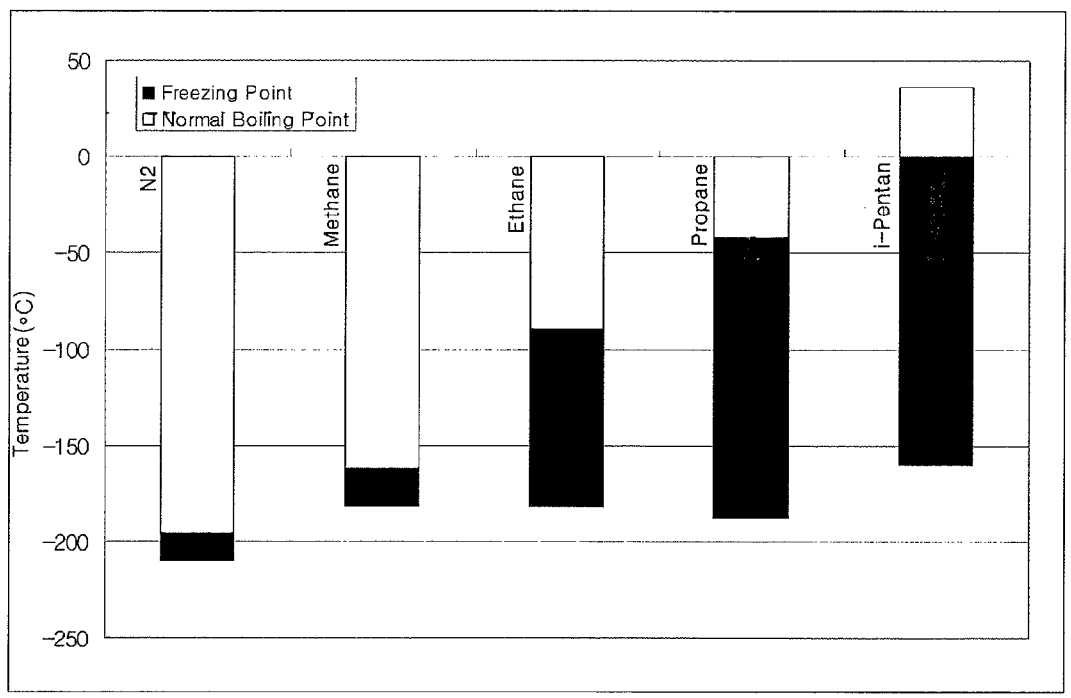
FIG. 4B is a graph illustrating the freezing points and boiling points of components contained in a hydrocarbon mixed refrigerant.
Figure 4C:
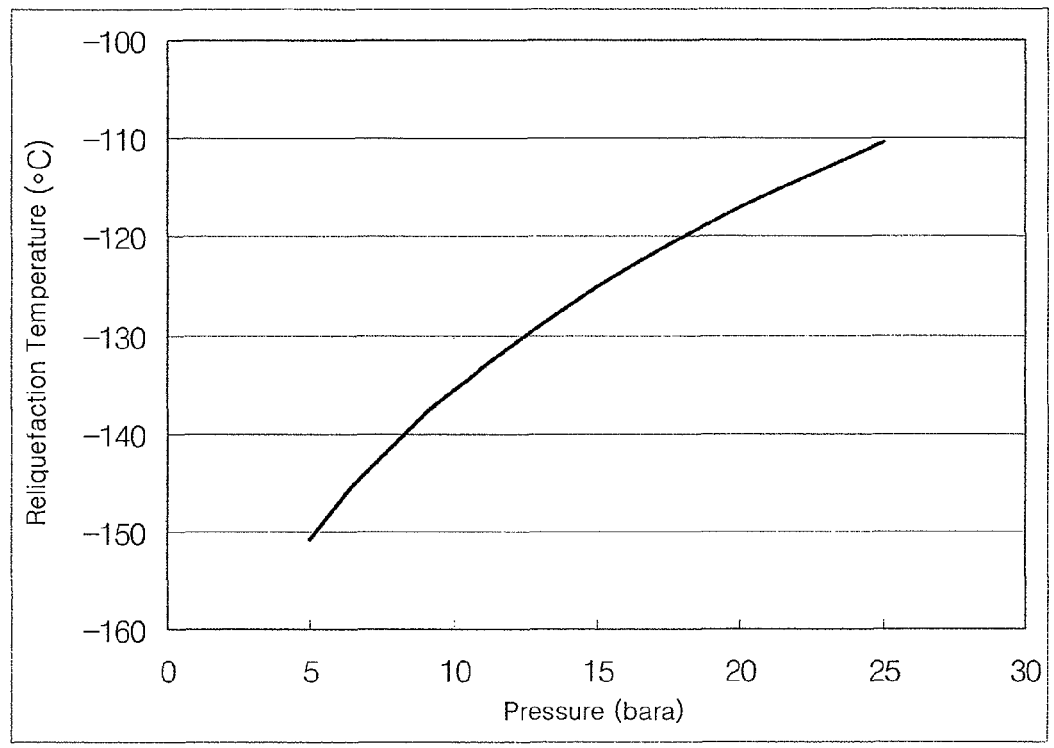
FIG. 4C is a graph illustrating a liquefaction temperature of natural gas according to a compression pressure.

On the other hand, as illustrated in FIGS. 4A and 4B, the HFC/FC refrigerants may not be used as a refrigerant when LNG is reliquefied, because the freezing points of the HFC/FC refrigerants are higher than a general temperature (−163° C.). However, the inventors of the present patent application developed a reliquefaction apparatus that could reliquefy BOG generated in an LNG storage tank of a marine structure by a high-efficiency, safe HFC/FC mixed refrigerant (i.e., nonflammable mixed refrigerant) Joule-Thomson refrigeration cycle, based on the knowledge that the liquefaction (or reliquefaction) temperature increases as the pressure of natural gas (or BOG) increases. In other words, according to the present invention, by compressing BOG to a medium pressure of about 12 to 45 bara before reliquefaction, the BOG can be reliquefied at a temperature higher than the reliquefaction temperature of the BOG at ambient pressure, that is, the freezing point of the nonflammable mixed refrigerant.

The nonflammable mixed refrigerant according to the present invention is prepared by mixing a variety of components, such that the boiling points are equally distributed between the liquefaction temperature of the natural gas (or the reliquefaction temperature of the BOG) and room temperature and thus a wide phase change range can be used. Refrigerants having similar boiling points are classified into five groups, and the nonflammable mixed refrigerant according to the present invention may be prepared by selecting one or more components from each group. That is, the nonflammable mixed refrigerant according to the present invention may be prepared by selecting at least one component from each of the five groups.

Figure 5:
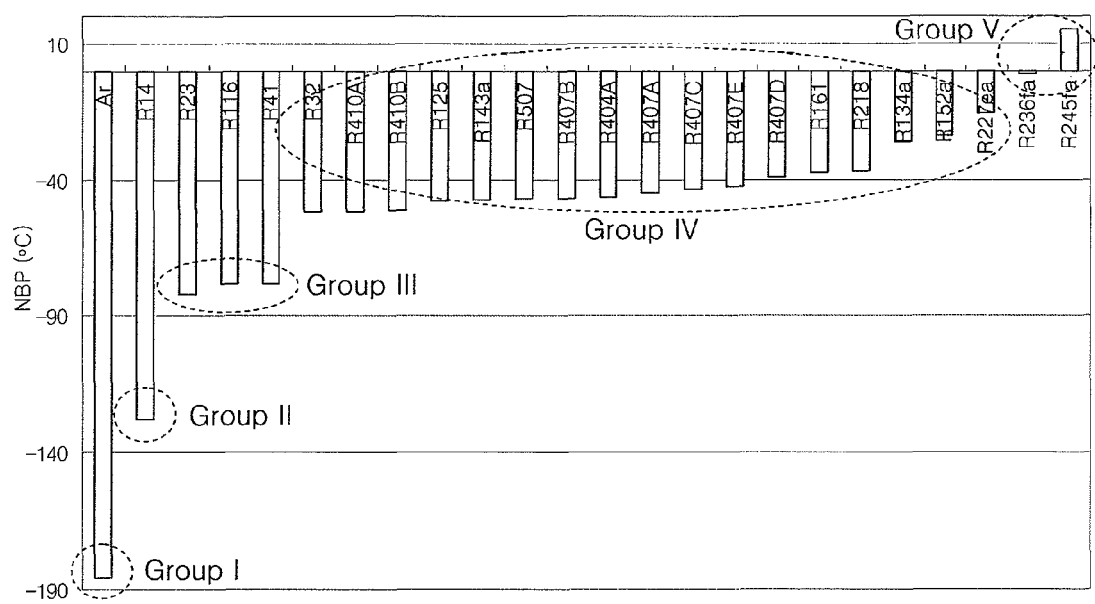
FIG. 5 is a graph illustrating the boiling points of components constituting a nonflammable mixed refrigerant.

As illustrated in FIG. 5, the group I includes argon (Ar) having the lowest boiling point among the refrigerants, and the group II includes R14. The group III includes R23, R116, and R41, and the group IV includes R32, R410A, R410B, R125, R143a, R507, R407B, R404A, R407A, R407C, R407E, R407D, R161, R218, R134a, R152a, and R227ea. The group V includes R236fa and R245fa.

When considering the easy supply of refrigerants and the costs thereof, the nonflammable mixed refrigerant according to the present invention, which is prepared by selecting one or more refrigerants from each of the five groups, may have components as shown in Table 4 below. It is preferable in terms of efficiency to determine the composition ratio of the nonflammable mixed refrigerant such that a difference in temperature between a high-temperature fluid (i.e., BOG) and a low-temperature fluid (i.e., the nonflammable mixed refrigerant) in the heat exchanger (i.e., the cold box 21) exchanging heat with the BOG is maintained as constantly as possible.

TABLE 4

| Component | Composition (% mole) |
| --- | --- |
| Ar | 20 to 55 |
| R14 | 15 to 30 |
| R23 | 5 to 15 |
| R410a | 10 to 15 |
| R245fa | 15 to 20 |

In the case where the nonflammable mixed refrigerant is used, power consumption (kW) can be reduced to improve the reliquefaction efficiency, as compared to the related art in which BOG is reliquefied using the nitrogen refrigerant.

More specifically, according to the present invention, the BOG reliquefaction is achieved by compressing BOG at a medium pressure of about 12 to 45 bara, which is relatively higher than the BOG reliquefaction pressure used in the conventional reliquefaction apparatus. Therefore, power consumption for the BOG reliquefaction can be reduced. In particular, in the case where the nonflammable mixed refrigerant having the above-mentioned composition is used, the reliquefaction apparatus can maintain the highest efficiency when BOG has a pressure of about 12 to 45 bara.

Also, when the pressure of BOG is 12 bara, the reliquefaction temperature is about −130° C. In order to cool the BOG to the reliquefaction temperature, the temperature of the nonflammable mixed refrigerant is lowered to about −155° C. The nonflammable mixed refrigerant having the above-mentioned composition may be frozen at a temperature of below −155° C. Thus, if the pressure of the BOG is lower than 12 bara, it may be difficult to configure the refrigeration cycle using the nonflammable mixed refrigerant.

Also, if the pressure of the BOG exceeds 45 bara, it is not preferable because the reduction of liquefaction energy is not great as compared to the increase of power consumption necessary to compress the BOG.

Referring to FIG. 6A, since the present invention provides a feature of the medium pressure, that is, the pressure range of about 12 to 45 bara (based on 4.3 ton/h of BOG), the present invention has effects in both the nitrogen refrigerant and the nonflammable mixed refrigerant. However, as compared to the reliquefaction apparatus using the nitrogen refrigerant, the reliquefaction apparatus using the nonflammable mixed refrigerant having the above-mentioned composition according to the present invention can further reduce power by about 10 to 20%.

FIG. 6B is a graph illustrating comparison of required power in the condition of the conventional reliquefaction apparatus (that is, in the case where the refrigerant used in the reliquefaction apparatus is nitrogen gas ($N_2$) and the pressure of BOG supplied to the reliquefaction apparatus is 8 bara) and required power in the condition of the reliquefaction apparatus using the nonflammable mixed refrigerant (NFMR) according to the present invention (that is, in the case where the refrigerant used in the reliquefaction apparatus is the nonflammable mixed refrigerant (NFMR) and the pressure of the BOG supplied to the reliquefaction apparatus is 12 to 45 bara). Referring to FIG. 6B, the reliquefaction apparatus according to the present invention can be operated with 50 to 80% of power consumed in the conventional reliquefaction apparatus (refrigeration cycle) using the nitrogen refrigerant. As such, since the reliquefaction apparatus according to the present invention can be operated with relatively low power as compared to the related art, the capacity of a power generator can be reduced, making it possible to miniaturize the power generator.

Meanwhile, the reliquefaction apparatus according to the present invention uses the Joule-Thomson valve as a refrigerant expansion unit, the entire system is simplified and cost-effective, as compared to a conventional nitrogen ($N_2$) compander.

Moreover, although not listed in Table 2 above, the nonflammable mixed refrigerant according to the present invention may contain a slight amount of nonflammable refrigerant components other than the components listed in Table 2 above.

(Second Embodiment)

Figure 7A:
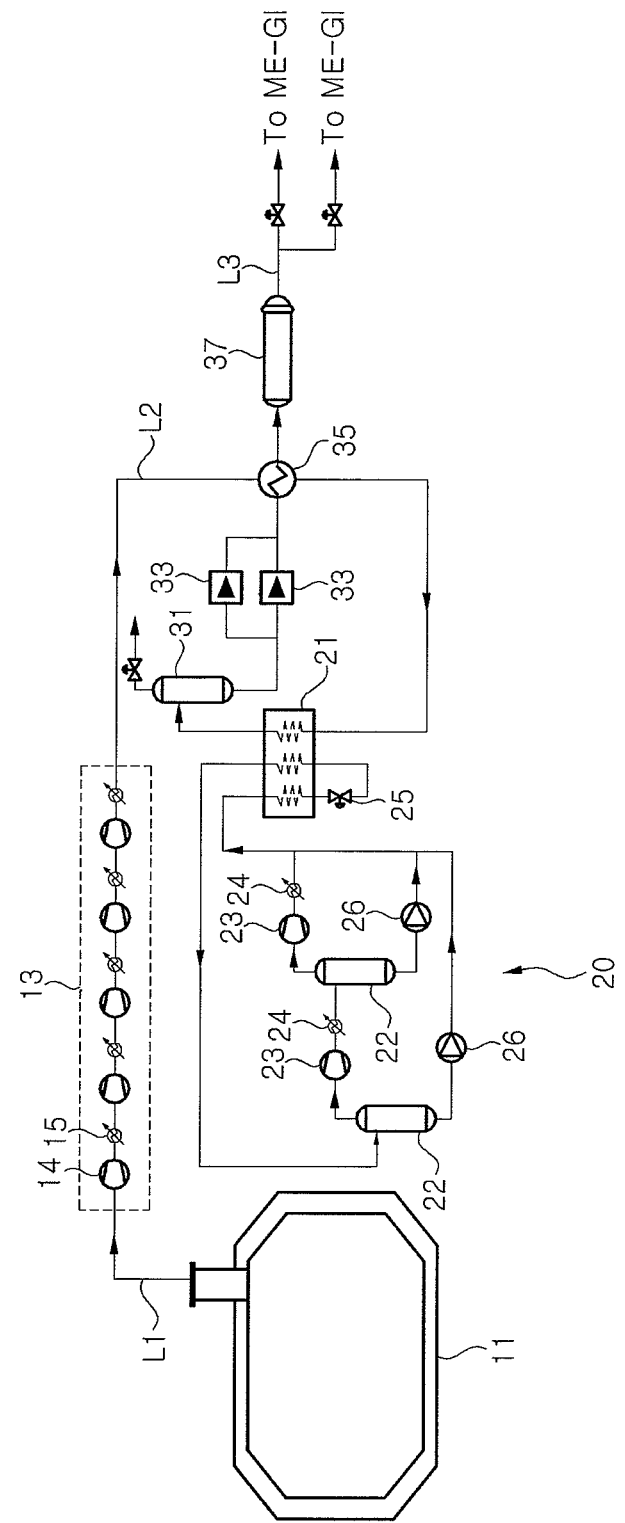
FIG. 7A is a configuration diagram illustrating a fuel supply system for a high-pressure natural gas injection engine according to a second embodiment of the present invention.

FIG. 7A is a configuration diagram illustrating a fuel supply system for a marine structure having a high-pressure natural gas injection engine (e.g., an ME-GI engine) according to a second embodiment of the present invention. The second embodiment illustrated in FIG. 7A is different from the first embodiment only in that before a reliquefaction apparatus reliquefies BOG compressed to a medium pressure, the fuel supply system preheats the compressed BOG by heat exchange with LNG supplied from a high-pressure pump 33 to a high-pressure gasifier 37. Thus, the following description will be focused on the difference from the first embodiment.

As illustrated in FIG. 7A, the liquefied BOG compressed to a high pressure by a high-pressure pump 33 exchanges heat with the BOG supplied to a reliquefaction apparatus 20, in a heat exchanger 35 before supply to a high-pressure gasifier 37. Since the liquefied BOG supplied to the high-pressure gasifier 37 is lower in temperature than the BOG supplied to the reliquefaction apparatus 20, it can reduce the temperature of the BOG supplied to the reliquefaction apparatus 20 while passing through the heat exchanger 35, thus making it possible to reduce reliquefaction energy in the reliquefaction apparatus 20. In addition, the liquefied BOG supplied to the high-pressure gasifier 37 is heated while passing through the heat exchanger 35, thus making it possible to reduce gasification energy in the high-pressure gasifier 37.

The BOG compressed in a BOG compressor 13 is supplied through a BOG supply line L2 to the reliquefaction apparatus 20. The heat exchanger 35 is installed in the middle of the BOG supply line L2. As described above, in the heat exchanger 35, the higher-temperature compressed BOG exchanges heat with the lower-temperature liquefied BOG discharged from the high-pressure pump 33. The BOG cooled while passing through the heat exchanger 35 is cooled and reliquefied by a refrigerant while passing through a cold box 21.

(Modified Example of Second Embodiment)

Figure 7B:
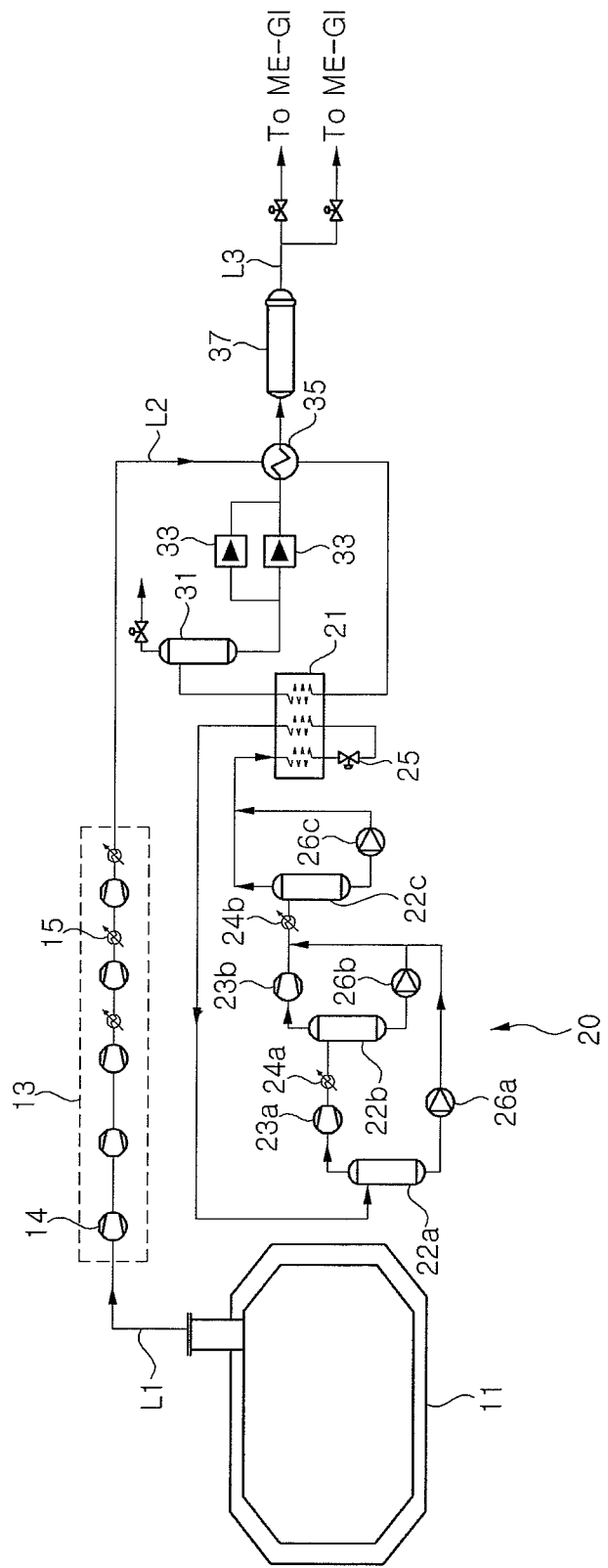
FIG. 7B is a configuration diagram illustrating a fuel supply system for a high-pressure natural gas injection engine according to a modified example of the second embodiment of the present invention.

FIG. 7B is a configuration diagram illustrating a fuel supply system according to a modified example of the second embodiment of the present invention. As described in the modified example of the first embodiment, the modified example of the second embodiment is partially different from the second embodiment in terms of the configurations of a BOG compression unit 13 and a reliquefaction apparatus 20.

That is, the modified example of the second embodiment is substantially identical to the second embodiment in that the BOG compression unit 13 includes five BOG compressors 14, but is different from the second embodiment in that an intermediate cooler 15 is not disposed between the first and second BOG compressors and between the second and third BOG compressors included in the BOG compression unit 13. According to the present invention, the intermediate cooler 15 may or may not be disposed between every two BOG compressors 14.

Like the reliquefaction apparatus 20 according to the modified example of the first embodiment illustrated in FIG. 3B, the reliquefaction apparatus 20 according to the modified example of the second embodiment includes a cold box 21 configured to exchange heat between a refrigerant and BOG, a compression unit configured to compress the refrigerant that is heated and at least partially gasified by the cold box 21, an expansion unit configured to expand the compressed refrigerant to reduce the temperature thereof, and a gas-liquid refrigerant separator configured to separate the gaseous refrigerant and the liquid refrigerant.

In particular, like the reliquefaction apparatus 20 according to the modified example of the first embodiment illustrated in FIG. 3B, the reliquefaction apparatus 20 according to the modified example of the second embodiment includes a plurality of gas-liquid refrigerant separators 22a, 22b and 22c. A gaseous refrigerant and a liquid refrigerant separated by the gas-liquid refrigerant separators 22a and 22b disposed at the upstream side are mixed and then supplied to the gas-liquid refrigerant separator 22c disposed at the most downstream side. The gaseous refrigerant separated by the gas-liquid refrigerant separators 22a and 22b disposed at the upstream side may be compressed by refrigerant compressors 23a and 23b and cooled by refrigerant coolers 24a and 24b before supply to the gas-liquid refrigerant separator 22c disposed at the most downstream side. The liquid refrigerant separated by the gas-liquid refrigerant separators 22a and 22b disposed at the upstream side is mixed with the gaseous refrigerant before the gaseous refrigerant is supplied to the gas-liquid refrigerant separator 22c disposed at the most downstream side, specifically before the gaseous refrigerant is cooled by the refrigerant cooler 24b.

(Third Embodiment)

Figure 8A:
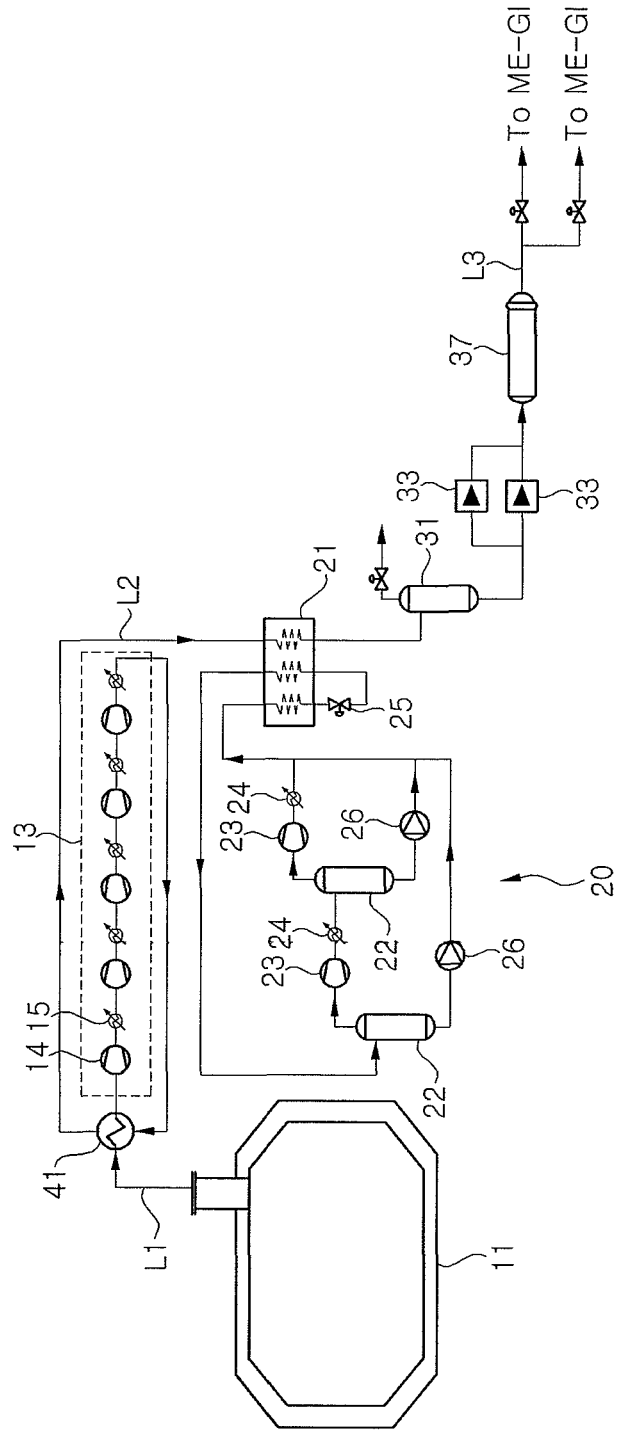
FIG. 8A is a configuration diagram illustrating a fuel supply system for a high-pressure natural gas injection engine according to a third embodiment of the present invention.

FIG. 8A is a configuration diagram illustrating a fuel supply system for a marine structure having a high-pressure natural gas injection engine (e.g., an ME-GI engine) according to a third embodiment of the present invention. The third embodiment illustrated in FIG. 8A is different from the first embodiment only in that the fuel supply system preheats BOG before compression. Thus, the following description will be focused on the difference from the first embodiment.

As illustrated in FIG. 8A, in the fuel supply system for a marine structure having a high-pressure natural gas injection engine according to the third embodiment of the present invention, natural boil-off gas (NBOG) generated and discharged from a liquefied gas storage tank 11 is compressed by a BOG compression unit 13 to a medium pressure of about 12 to 45 bara. The compressed BOG is supplied to a BOG preheater 41 installed at the upstream side of a BOG compression unit 13, before supply to a reliquefaction apparatus 20. The BOG compressed by the BOG compression unit 13 to about 12 to 45 bara and cooled by an intermediate cooler 15 to about 40° C. is cooled by heat exchange with cryogenic BOG discharged from the liquefied gas storage tank 11 to the BOG preheater 41, and then is supplied to the reliquefaction apparatus 20.

According to the third embodiment, the temperature of the BOG to be supplied to the reliquefaction apparatus 20 can be reduced through the BOG preheater 41, so that a heat load on the cold box 21 can be reduced. Also, the cryogenic BOG supplied to the BOG compression unit 13 and the higher-temperature BOG compressed by the BOG compression unit 13 exchange heat with each other in the BOG preheater 41 located at the upstream side of the BOG compression unit 13, so that the temperature of the BOG supplied to the BOG compression unit can be increased and the inlet temperature of the BOG compression unit (i.e., the BOG compressor) can be maintained constant.

As in the fuel supply system according to the first embodiment, BOG compressed by the BOG compression unit 13 and then passing through the BOG preheater 41 is supplied to the reliquefaction apparatus 20. Liquefied BOG (LBOG) reliquefied by liquefaction energy (i.e., cold heat) in the reliquefaction apparatus 20 is compressed by a high-pressure pump 33 to a high pressure of about 150 to 400 bara and then is supplied to a high-pressure gasifier 37. BOG gasified by the high-pressure gasifier 37 is supplied as fuel to a high-pressure natural gas injection engine (e.g., an ME-GI engine).

(Modified Example of Third Embodiment)

Figure 8B:
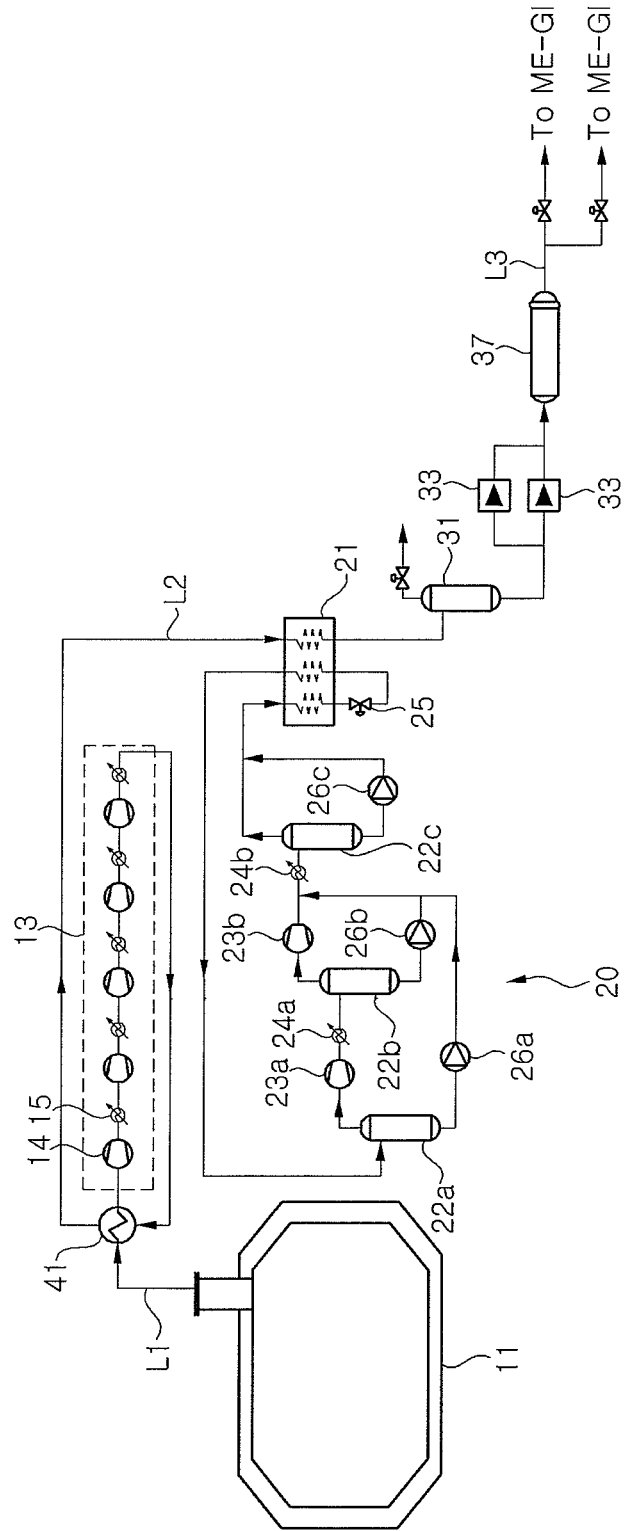
FIG. 8B is a configuration diagram illustrating a fuel supply system for a high-pressure natural gas injection engine according to a modified example of the third embodiment of the present invention.

FIG. 8B is a configuration diagram illustrating a fuel supply system according to a modified example of the third embodiment of the present invention. The modified example of the third embodiment is partially different from the third embodiment in terms of the configuration of a reliquefaction apparatus 20.

That is, like the reliquefaction apparatus 20 according to the modified example of the first embodiment illustrated in FIG. 3B, the reliquefaction apparatus 20 according to the modified example of the third embodiment includes a cold box 21 configured to exchange heat between a refrigerant and BOG, a compression unit configured to compress the refrigerant that is heated and at least partially gasified by the cold box 21, an expansion unit configured to expand the compressed refrigerant to reduce the temperature thereof, and a gas-liquid refrigerant separator configured to separate the gaseous refrigerant and the liquid refrigerant.

In particular, like the reliquefaction apparatus 20 according to the modified example of the first embodiment illustrated in FIG. 3B, the reliquefaction apparatus 20 according to the modified example of the third embodiment includes a plurality of gas-liquid refrigerant separators 22a, 22b and 22c. A gaseous refrigerant and a liquid refrigerant separated by the gas-liquid refrigerant separators 22a and 22b disposed at the upstream side are mixed and then supplied to the gas-liquid refrigerant separator 22c disposed at the most downstream side. The gaseous refrigerant separated by the gas-liquid refrigerant separators 22a and 22b disposed at the upstream side may be compressed by refrigerant compressors 23a and 23b and cooled by refrigerant coolers 24a and 24b before supply to the gas-liquid refrigerant separator 22c disposed at the most downstream side. The liquid refrigerant separated by the gas-liquid refrigerant separators 22a and 22b disposed at the upstream side is mixed with the gaseous refrigerant before the gaseous refrigerant is supplied to the gas-liquid refrigerant separator 22c disposed at the most downstream side, specifically before the gaseous refrigerant is cooled by the refrigerant cooler 24b.

(Fourth Embodiment)

Figure 9A:
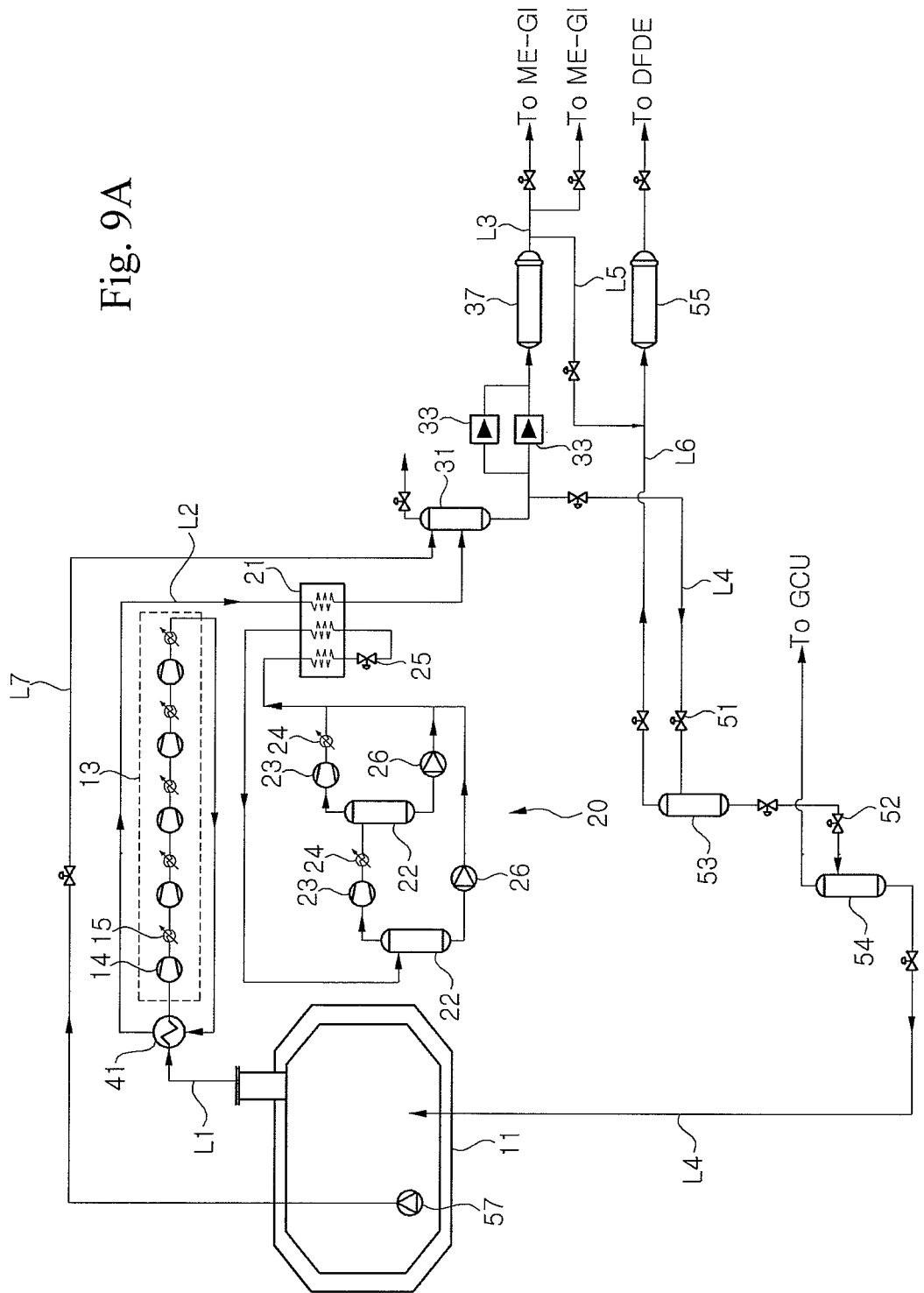
FIG. 9A is a configuration diagram illustrating a fuel supply system for a high-pressure natural gas injection engine according to a fourth embodiment of the present invention.

FIG. 9A is a configuration diagram illustrating a fuel supply system for a marine structure having a high-pressure natural gas injection engine (e.g., an ME-GI engine) according to a fourth embodiment of the present invention. The fourth embodiment illustrated in FIG. 9A is different from the third embodiment in that the fuel system further includes an excess BOG consumption unit (e.g., a Dual-Fuel Diesel Engine (DFDE)) configured to process excess BOG and a stable fuel supply unit (e.g., an LNG supply line). Thus, the following description will be focused on the difference from the third embodiment.

Herein, the excess BOG is the BOG that is more than the amount of liquefied BOG required by the high-pressure natural gas injection engine. The excess BOG may be generated when a large amount of BOG is generated, even when the high-pressure natural gas injection engine is in operation. Also, the excess BOG may be generated when the high-pressure natural gas injection engine operates at a low speed or does not operate (e.g., when entering into port or passing through a canal).

In the fuel supply system for a marine structure having a high-pressure natural gas injection engine according to the fourth embodiment of the present invention, when a load on the high-pressure natural gas injection engine decreases, or when an excess amount of BOG is generated, excess LBOG is decompressed through an LBOG expansion valve 51 installed at an LBOG return line IA branching at a rear end of a buffer tank 31 from a fuel supply line L3. LBOG including flash gas generated in the decompression process is separated by a gas-liquid separator into a liquid component (LBOG) and a gaseous component (flash gas), and the liquid component is returned through the LBOG return line L4 to a storage tank 11.

Specifically, the LBOG decompressed through the LBOG expansion valve and including flash gas is supplied to a gas-liquid LBOG separator 53 and divided by the gas-liquid LBOG separator 53 into a liquid component and a gaseous component. The gaseous component (i.e., flash gas) separated by the gas-liquid LBOG separator 53 is supplied as fuel through a fuel gas supply line L6 to an excess BOG consumption unit (e.g., a DFDE) that may be installed in the marine structure for power generation. The pressure of fuel gas supplied to the DFDE may be controlled by a pressure control valve that is installed at the downstream side of the gas-liquid LBOG separator 53 in the middle of the fuel gas supply line L6. Also, by a fuel gas heater 55 installed in the middle of the fuel gas supply line L6, the temperature of the fuel gas may be heated up to a temperature required by the DFDE. The liquid component separated by the gas-liquid LBOG separator 53 is returned through the LBOG return line LA to the storage tank.

Since the fuel gas supply pressure of the DFDE is generally about 5 to 8 bara, the pressure of the liquid component separated by the gas-liquid LBOG separator 53 may still be higher than ambient pressure. In this case, the liquid component (i.e., LBOG) separated by the gas-liquid LBOG separator 53 is additionally decompressed through another LBOG expansion valve 52. The decompressed liquid component is supplied to another gas-liquid LBOG separator 54 and separated by the gas-liquid LBOG separator 54 into a liquid component (LBOG) and a gaseous component (flash gas). The ambient-pressure liquid component separated by the gas-liquid LBOG separator 54 is returned through the LBOG return line L4 to the storage tank 11. The gaseous component separated by the gas-liquid LBOG separator 54 may be supplied to and consumed by a gas combustion unit (GCU) serving as another excess BOG consumption unit.

On the other hand, when insufficient fuel is supplied to the DFDE, additional fuel may be supplied to the DFDE through a branch line L5 that branches from the fuel supply line L3 supplying fuel to the high-pressure natural gas injection engine (e.g., ME-GI engine) and connects with the fuel gas supply line L6 supplying fuel to the DFDE. A pressure drop valve is installed at the branch line L5.

Also, when the BOG reliquefaction apparatus does not operate or when a small amount of BOG is generated in the storage tank 11, LNG stored in the storage tank 11 may be supplied to the buffer tank 31 through an LNG supply line L7 and an LNG supply pump 57 installed in the storage tank 11.

In this manner, the DFDE functions as a flash gas processing unit that can process flash gas that may be generated from LBOG in the process of returning to the storage tank 11 due to a pressure difference.

Although not illustrated in the drawings, the gaseous component separated by the gas-liquid LBOG separator 53 may be supplied and used as fuel for a consumption unit such as a gas turbine or a boiler, instead of the DFDE. Also, the gaseous component may be supplied to and processed by a gas discharge device discharging natural gas into the atmosphere or a gas combustion device (e.g., a flare tower) combusting natural gas in the atmosphere. In this case, the DFDE, the gas turbine, the boiler, the gas discharge device, or the flare tower may be included in the excess BOG consumption unit (or the flash gas processing unit), and the gaseous component supplied to the excess BOG consumption unit may be heated by the fuel gas heater 55.

When the BOG compressed by the BOG compression unit 13 to a medium pressure of about 12 to 45 bara and then liquefied by the reliquefaction apparatus 20 is not completely consumed by the high-pressure natural gas injection engine such as an ME-GI engine, the medium-pressure liquefied BOG needs to be returned to the storage tank 11. Since the storage tank 11 is in the state of ambient pressure, the pressure of the liquefied BOG needs to be reduced before the liquefied BOG is supplied to the storage tank. However, flash gas is generated in the process of reducing the pressure. Therefore, the inventors of the present invention invented the fuel supply system including the excess BOG consumption unit capable of processing flash gas. The present invention provides the fuel supply system including the excess BOG consumption unit capable of processing flash gas. Therefore, the BOG compressed to a medium pressure of about 12 to 45 bara can be supplied to the reliquefaction apparatus. Accordingly, the energy consumption in reliquefaction can be reduced.

(Modified Example of Fourth Embodiment)

Figure 9B:
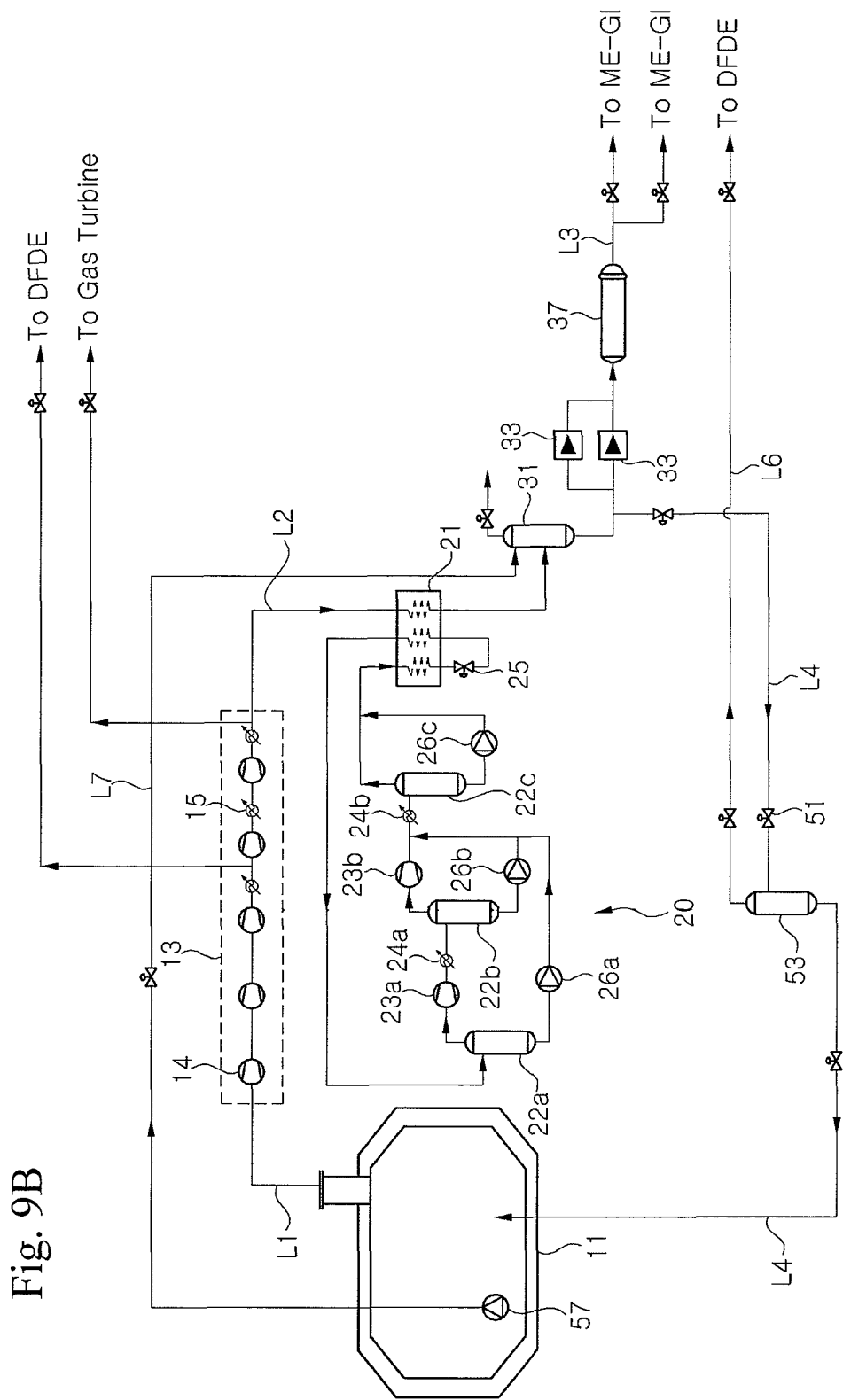
FIG. 9B is a configuration diagram illustrating a fuel supply system for a high-pressure natural gas injection engine according to a modified example of the fourth embodiment of the present invention.

FIG. 9B is a configuration diagram illustrating a fuel supply system according to a modified example of the fourth embodiment of the present invention. The modified example of the fourth embodiment is partially different from the fourth embodiment in terms of the configuration of a reliquefaction apparatus 20 and is also different from the fourth embodiment in that the fuel supply system processes excess BOG through a line branching from a BOG compression unit 13 or the end of a downstream side thereof.

Like the reliquefaction apparatus 20 according to the modified example of the first embodiment illustrated in FIG. 3B, the reliquefaction apparatus 20 according to the modified example of the fourth embodiment includes a cold box 21 configured to exchange heat between a refrigerant and BOG, a compression unit configured to compress the refrigerant that is heated and at least partially gasified by the cold box 21, an expansion unit configured to expand the compressed refrigerant to reduce the temperature thereof, and a gas-liquid refrigerant separator configured to separate the gaseous refrigerant and the liquid refrigerant.

In particular, like the reliquefaction apparatus 20 according to the modified example of the first embodiment illustrated in FIG. 3B, the reliquefaction apparatus 20 according to the modified example of the fourth embodiment includes a plurality of gas-liquid refrigerant separators 22a, 22b and 22c. A gaseous refrigerant and a liquid refrigerant separated by the gas-liquid refrigerant separators 22a and 22b disposed at the upstream side are mixed and then supplied to the gas-liquid refrigerant separator 22c disposed at the most downstream side. The gaseous refrigerant separated by the gas-liquid refrigerant separators 22a and 22b disposed at the upstream side may be compressed by refrigerant compressors 23a and 23b and cooled by refrigerant coolers 24a and 24b before supply to the gas-liquid refrigerant separator 22c disposed at the most downstream side. The liquid refrigerant separated by the gas-liquid refrigerant separators 22a and 22b disposed at the upstream side is mixed with the gaseous refrigerant before the gaseous refrigerant is supplied to the gas-liquid refrigerant separator 22c disposed at the most downstream side, specifically before the gaseous refrigerant is cooled by the refrigerant cooler 24b.

Also, in the fuel supply system according to the modified example of the fourth embodiment, when an excess amount of BOG is generated, the excess BOG may be supplied to a DFDE serving as an excess BOG consumption unit, through a second branch line L8 branching from a BOG compression unit 13. In this case, since the BOG is cooled to about 40° C. by an intermediate cooler 15 included in the BOG compression unit 13, a separate heater configured to control the temperature of BOG supplied to the DFDE may be omitted.

Alternatively, the excess BOG may be supplied to a gas turbine serving as another excess BOG consumption unit, through a third branch line L9 branching from a rear end of the BOG compression unit 13. Likewise, in this case, a separate unit configured to control the temperature of BOG supplied to the gas turbine may be omitted.

Also, unlike the fuel supply system according to the fourth embodiment, the fuel supply system according to the modified example of the fourth embodiment includes an LBOG expansion valve and a gas-liquid LBOG separator installed at an LBOG return line L4. However, if necessary, the fuel supply system according to the modified example of the fourth embodiment may further include another LBOG expansion valve 52 and another gas-liquid LBOG separator 54 like the fuel supply system according to the fourth embodiment.

(Fifth Embodiment)

Figure 10A:
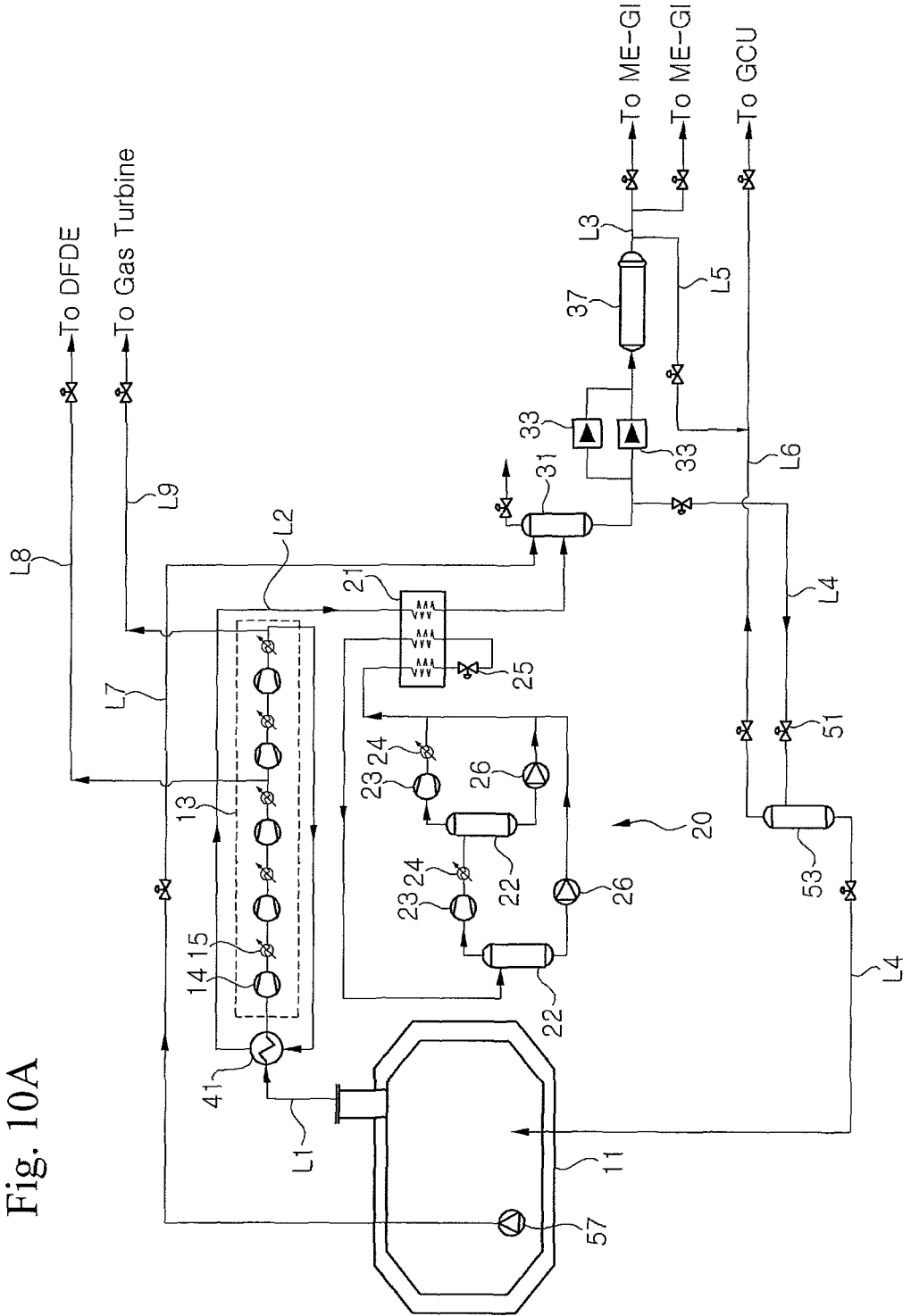
FIG. 10A is a configuration diagram illustrating a fuel supply system for a high-pressure natural gas injection engine according to a fifth embodiment of the present invention.

FIG. 10A is a configuration diagram illustrating a fuel supply system for a marine structure having a high-pressure natural gas injection engine (e.g., an ME-GI engine) according to a fifth embodiment of the present invention. The fifth embodiment illustrated in FIG. 10A is different from the third embodiment in that the fuel supply system further includes an excess BOG consumption unit (e.g., a GCU) configured to consume excess BOG and a stable fuel supply unit (e.g., an LNG supply line). Also, the fifth embodiment is different from the third embodiment in that the fuel supply system includes a unit (e.g., a DFDE) configured to branch and consume a portion of BOG before reliquefaction to prevent the generation of excess BOG. Thus, the following description will be focused on the difference from the third embodiment.

In the fuel supply system for a marine structure having a high-pressure natural gas injection engine according to the fifth embodiment of the present invention, when a load on the high-pressure natural gas injection engine decreases, or when an excess amount of LBOG is expected to be generated due to the generation of a large amount of BOG, BOG compressed or being compressed by a BOG compression unit 13 is shunted through a branch line to an excess BOG consumption unit.

That is, the excess BOG may be supplied to a DFDE serving as an excess BOG consumption unit, through a second branch line L8 branching from the BOG compression unit 13. In this case, since the BOG is cooled to about 40° C. by an intermediate cooler 15 included in the BOG compression unit 13, a separate heater configured to control the temperature of BOG supplied to the DFDE may be omitted.

Alternatively, the excess BOG may be supplied to a gas turbine serving as another excess BOG consumption unit, through a third branch line L9 branching from a rear end of the BOG compression unit 13. Likewise, in this case, a separate unit configured to control the temperature of BOG supplied to the gas turbine may be omitted.

On the other hand, even when the amount of BOG supplied to a reliquefaction apparatus 20 is reduced, if the amount of BOG supplied as fuel is more than the amount of BOG required by the high-pressure natural gas injection unit, the excess BOG is processed in the same manner as in the fourth embodiment.

That is, the excess LBOG is decompressed through an LBOG expansion valve 51 installed at an LBOG return line L4 branching at a rear end of a buffer tank 31 from a fuel supply line L3. LBOG including flash gas generated in the decompression process is separated by a gas-liquid LBOG separator 53 into a liquid component (LBOG) and a gaseous component (flash gas), and the liquid component is returned through the LBOG return line L4 to a storage tank 11. The gaseous component (i.e., flash gas) separated by the gas-liquid LBOG separator 53 is supplied as fuel through a fuel gas supply line L6 to a GCU serving as an excess BOG combustion unit.

On the other hand, the excess BOG may be additionally supplied to the GCU through a branch line L5 that branches from the fuel supply line L3 supplying fuel to the high-pressure natural gas injection engine (e.g., ME-GI engine) and connects with the fuel gas supply line L6. A pressure drop valve is installed at the branch line L5.

Also, as in the fourth embodiment, when the BOG reliquefaction apparatus does not operate or when a small amount of BOG is generated in the storage tank 11, LNG stored in the storage tank 11 may be supplied to the buffer tank 31 through an LNG supply line L7 and an LNG supply pump 57 installed in the storage tank 11.

In the fourth and fifth embodiments, the DFDE (in the fourth embodiment) and the GCU (in the fifth embodiment) configured to process generated flash gas, and the DFDE (in the fifth embodiment) and the GCU (in the fifth embodiment) configured to consume excess BOG before reliquefaction in order to prevent the generation of flash gas, may be commonly called a flash gas suppression unit because they can suppress the generation of flash gas. All of these units may also be called an excess gas consumption unit because they can consume excess BOG that is more than the amount of fuel required by the high-pressure natural gas injection unit.

(Modified Example of Fifth Embodiment)

Figure 10B:
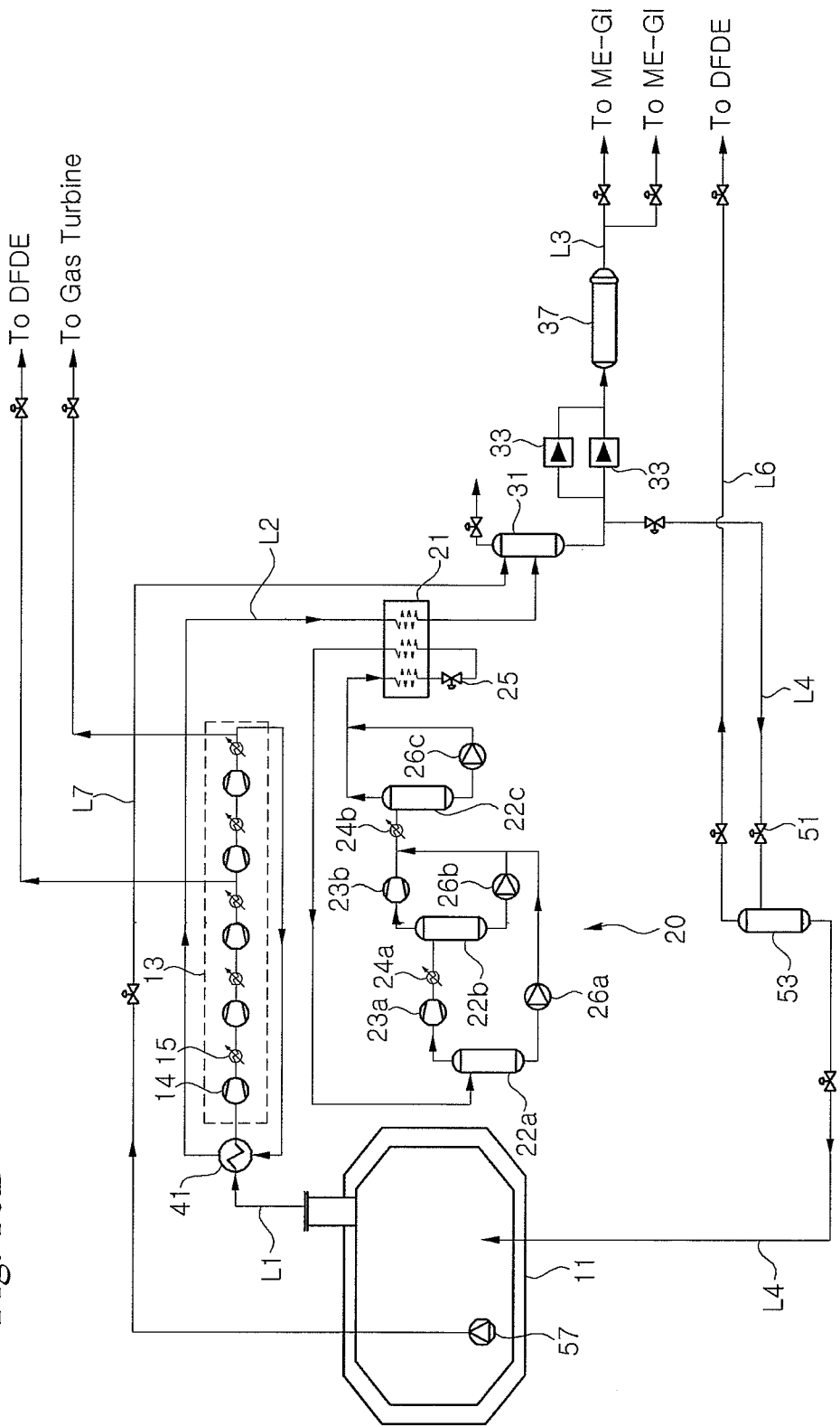
FIG. 10B is a configuration diagram illustrating a fuel supply system for a high-pressure natural gas injection engine according to a modified example of the fifth embodiment of the present invention.

FIG. 10B is a configuration diagram illustrating a fuel supply system according to a modified example of the fifth embodiment of the present invention. The modified example of the fifth embodiment is partially different from the fifth embodiment in terms of the configuration of a reliquefaction apparatus 20.

Like the reliquefaction apparatus 20 according to the modified example of the first embodiment illustrated in FIG. 3B, the reliquefaction apparatus 20 according to the modified example of the fifth embodiment includes a cold box 21 configured to exchange heat between a refrigerant and BOG, a compression unit configured to compress the refrigerant that is heated and at least partially gasified by the cold box 21, an expansion unit configured to expand the compressed refrigerant to reduce the temperature thereof, and a gas-liquid refrigerant separator configured to separate the gaseous refrigerant and the liquid refrigerant.

In particular, like the reliquefaction apparatus 20 according to the modified example of the first embodiment illustrated in FIG. 3B, the reliquefaction apparatus 20 according to the modified example of the fifth embodiment includes a plurality of gas-liquid refrigerant separators 22a, 22b and 22c. A gaseous refrigerant and a liquid refrigerant separated by the gas-liquid refrigerant separators 22a and 22b disposed at the upstream side are mixed and then supplied to the gas-liquid refrigerant separator 22c disposed at the most downstream side. The gaseous refrigerant separated by the gas-liquid refrigerant separators 22a and 22b disposed at the upstream side may be compressed by refrigerant compressors 23a and 23b and cooled by refrigerant coolers 24a and 24b before supply to the gas-liquid refrigerant separator 22c disposed at the most downstream side. The liquid refrigerant separated by the gas-liquid refrigerant separators 22a and 22b disposed at the upstream side is mixed with the gaseous refrigerant before the gaseous refrigerant is supplied to the gas-liquid refrigerant separator 22c disposed at the most downstream side, specifically before the gaseous refrigerant is cooled by the refrigerant cooler 24b.

(Sixth Embodiment)

Figure 11:
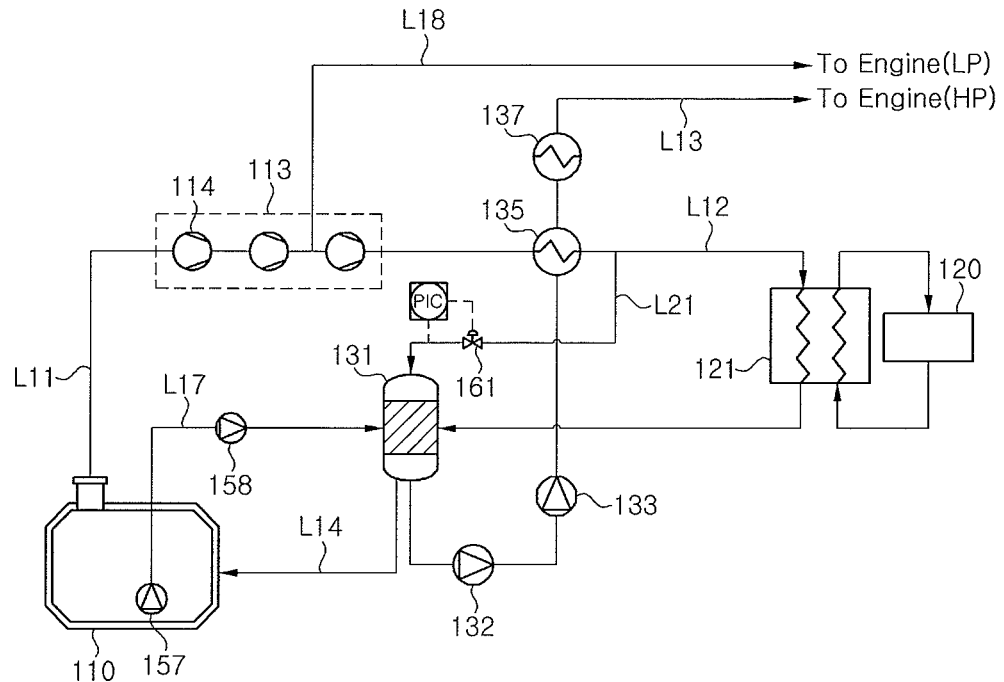
FIG. 11 is a configuration diagram illustrating a fuel supply system for a high-pressure natural gas injection engine according to a sixth embodiment of the present invention.

FIG. 11 is a configuration diagram illustrating a fuel supply system for a marine structure having a high-pressure natural gas injection engine (e.g., an ME-GI engine) according to a sixth embodiment of the present invention. The sixth embodiment illustrated in FIG. 11A is different from the first to fifth embodiments in that the fuel supply system uses a recondenser instead of the buffer tank.

In the fuel supply system for a marine structure having a high-pressure natural gas injection engine according to the sixth embodiment of the present invention, natural boil-off gas (NBOG) generated and discharged from a liquefied gas storage tank 110 is compressed by a BOG compression unit 113 to a medium pressure of about 12 to 45 bara and then is supplied to a reliquefaction apparatus 120. Liquefied BOG (LBOG) reliquefied by liquefaction energy (i.e., cold heat) in the reliquefaction apparatus 120 is compressed by a high-pressure pump 133 to a high pressure of about 150 to 400 bara and then is supplied to a high-pressure gasifier 137. BOG gasified by the high-pressure gasifier 137 is supplied as fuel to a high-pressure natural gas injection engine (e.g., an ME-GI engine).

The storage tank includes a sealing and insulating barrier to store liquefied gas such as LNG in a cryogenic state. However, the storage tank cannot completely interrupt heat transmitted from the outside. Accordingly, liquefied gas is continuously boiled off in the storage tank 110. In order to maintain the pressure of BOG in the storage tank 110, at a suitable level, the BOG is discharged through a BOG discharge line L11.

The discharged BOG is supplied through the BOG discharge line L11 to the BOG compression unit 113. The BOG compression unit 113 includes at least one BOG compressor 114. Although not illustrated, the BOG compression unit 113 may include at least one intermediate cooler configured to cool the BOG heated by being compressed by the BOG compressor 114. FIG. 11 illustrates a three-stage BOG compression unit 113 including three BOG compressors 114.

The BOG compressed by the BOG compression unit 113 is supplied through a BOG supply line L12 to the reliquefaction apparatus 120. The BOG supplied to the reliquefaction apparatus 120 is cooled and reliquefied by a refrigerant while passing through a main cryogenic heat exchanger 121 (i.e., a cold box) of the reliquefaction apparatus 120.

The reliquefaction apparatus 120 may have any configuration that can reliquefy BOG generated from liquefied gas such as LNG. For example, the reliquefaction apparatus 120 may be a reliquefaction system using a nonflammable mixed refrigerant, as described in the first to fifth embodiments and the modified examples thereof. Also, the reliquefaction apparatus 120 may be a conventional reliquefaction system using a nitrogen refrigerant. For example, the reliquefaction apparatus 120 may be any one of the reliquefaction apparatuses disclosed in International Patent Publication Nos. WO 2007/117148 and WO 2009/136793.

The BOG reliquefied by heat exchange in the cold box 121 is supplied to and temporarily stored in a recondenser 131. According to this embodiment, the liquefied BOG and the liquefied gas (i.e., LNG) supplied from the liquefied gas storage tank 110 are temporarily stored in the recondenser 131, and a portion or all of the BOG supplied from the liquefied gas storage tank 110 to the reliquefaction apparatus 120 is bypassed to and recondensed by the recondenser 131. Accordingly, the inflow of BOG into the reliquefaction apparatus 120 is reduced or removed, thereby improving the total system efficiency. As described below in detail, the recondenser 131 recondenses a portion or all of the generated BOG by using cold heat from one of the liquefied BOG reliquefied by the reliquefaction apparatus 120 and then supplied to and temporarily stored in the recondenser 131 and the liquefied gas (i.e., LNG) supplied from the storage tank 110 directly to the recondenser 131.

Like the buffer tank in the above-described embodiments, the recondenser 131 may also separate a gaseous component and a liquid component. Therefore, the liquefied gas temporarily stored in the recondenser 131 are separated into a gaseous state and a liquid state, and only the gaseous liquefied gas is supplied through a fuel supply line L13 to a high-pressure pump 133. A plurality of high-pressure pumps 133, for example, two high-pressure pumps 133 may be installed in parallel.

The high-pressure pump 133 compresses the liquefied gas to a fuel supply pressure required by a high-pressure natural gas injection engine (e.g., an ME-GI engine). The liquefied gas outputted from the high-pressure pump 133 has a high pressure of about 150 to 400 bara.

In order to provide a sufficient Net Positive Suction Head (NPSH) in the high-pressure pump 133, a booster pump 132 may be installed between the high-pressure pump 133 and the recondenser 131 on the fuel supply line L13, if necessary.

Also, as in the second embodiment, the system may be configured such that the liquefied gas compressed by the high-pressure pump 133 to a high pressure exchanges heat with the BOG supplied from the reliquefaction apparatus 120, in a heat exchanger 135 before supply to a high-pressure gasifier 137. The liquefied gas supplied to the high-pressure gasifier 137 is lower in temperature than the BOG supplied to the reliquefaction apparatus 120. Therefore, the BOG supplied to the reliquefaction apparatus 120 can be cooled while passing through the heat exchanger 135, so that the reliquefaction energy in the reliquefaction apparatus 120 can be reduced. Also, the liquefied gas supplied to the high-pressure gasifier 137 can be heated while passing through the heat exchanger 135, so that the gasification energy in the high-pressure gasifier 137 can be reduced.

If necessary, the liquefied BOG recondensed by and temporarily stored in the recondenser 131 may be returned through an LBOG return line L14 to the storage tank 110. Although not illustrated in FIG. 11, the expansion valve and the gas-liquid separator of the fourth and fifth embodiments and the modified examples thereof described with reference to FIGS. 9A to 10B may be installed at the LBOG return line L14.

However, according to the fuel supply system of the sixth embodiment, all of the BOG generated in the storage tank is used as fuel for the high-pressure natural gas injection engine for most period of time during the voyage of the marine structure. Accordingly, the liquefied gas returning through the LBOG return line L14 to the storage tank 110 can be removed. The LBOG return line L14 may be used to return the LBOG from the recondenser 131 to the storage tank 110 only in exceptional cases where the power consumption of the high-pressure natural gas injection engine is much smaller than the amount of BOG generated in the storage tank, such as a case where the marine structure is towed to come alongside the quay, a case where the marine structure passes through a canal, and a case where the marine structure is sailing at low speed. The LBOG return line L14 may also be used to return the LBOG, which remains in the recondenser 131 during the malfunction or the maintenance of the recondenser 131.

According to this embodiment, all of the LBOG can be used in the engine for most period of time during the voyage of the marine structure without returning to the storage tank. In this case, since the returning LBOG itself is removed, it is possible to prevent the generation of flash gas that may be caused by a pressure difference while the LBOG is returned to the storage tank 110. In this specification, the expression "removing flash gas" means consuming generated flash gas to prevent flash gas from being supplied into the storage tank 110, and also means preventing the return of liquefied BOG to the storage tank to block and prevent the generation of flash gas itself that may be caused by the returning LBOG.

Also, the expression "the fuel consumption of the high-pressure natural gas injection engine" in the sentence "the fuel consumption of the high-pressure natural gas injection engine is larger or smaller than the amount of BOG generated in the storage tank" means the sum of the fuel consumption of the high-pressure natural gas injection engine and the fuel consumption of other engines (e.g., a DFDE and a gas turbine) using BOG in the marine structure as fuel. When only the high-pressure natural gas injection engine among various engines uses BOG as fuel, the expression "the fuel consumption of the high-pressure natural gas injection engine" means the fuel consumption of only the high-pressure natural gas injection engine.

When the amount of BOG generated in the storage tank 110 is smaller than the amount of fuel required by the high-pressure natural gas injection engine, the LNG stored in the storage tank 110 may be supplied through the LNG supply line L17 directly to the recondenser 131. A submerged pump 157 is installed at one end of the LNG supply line L17, i.e., the start point of the LNG supply line L17 located in the storage tank, so that the LNG stored in the storage tank 110 can be supplied directly to the recondenser 131. According to this embodiment, since the internal pressure of the recondenser 131 (or the buffer tank 31 in the first to fifth embodiments and the modified examples thereof) is substantially equal to the pressure of the BOG compressed by the BOG compression unit 130 to a medium pressure of about 12 to 45 bara, there may be a limit in using only the submerged pump 157 to compress the liquefied gas stored in the storage tank 110 at about ambient pressure, to a medium pressure. Thus, it may be preferable that a booster pump 158 is installed in the middle of the LNG supply line L17 to compress the liquefied gas discharged by the submerged pump 157 to the outside of the storage tank, to a pressure substantially equal to the internal pressure of the recondenser 131 (or the buffer tank).

When the amount of BOG generated in the storage tank 110 is larger than the amount of fuel required by the high-pressure natural gas injection engine and thus excess LBOG is expected to be generated, the BOG gradually compressed or compressed by the BOG compression unit 113 is shunted through a BOG branch line L18 and used in a BOG consumption unit. The BOG consumption unit may be a gas turbine or a DFDE that can use lower-temperature natural gas than the ME-GI engine.

As described above, in order to reduce a load on the reliquefaction apparatus 120 or to completely stop an operation of the reliquefaction apparatus 120, the fuel supply system according to this embodiment may include a BOG bypass line L21 that branches from the BOG supply line L12 to supply a portion or all of the BOG compressed by the BOG compression unit, to the recondenser 131 by bypassing the reliquefaction apparatus 120.

Specifically, it may be preferable that the BOG bypass line L21 branches from the downstream side of the heat exchanger 135 of the BOG supply line L12 and connects with the recondenser 131. If necessary, a pressure control valve 161 may be installed at the BOG bypass line L21 to control the pressure of the recondenser 131.

When the amount of BOG generated in the storage tank 110 is smaller than the amount of fuel required by the high-pressure natural gas injection engine, the LNG in the storage tank 110 is supplied to the recondenser 131 to supplement an insufficient fuel amount. In this case, a portion of the BOG supplied to the reliquefaction apparatus 120 is supplied through the BOG bypass line L21 to the recondenser 131 and is recondensed by being mixed with LNG. Accordingly, a load on the reliquefaction apparatus 120 can be reduced.

Hereinafter, with reference to FIG. 11, a description will be give of a method of using the recondenser 131 to operate the fuel supply system of the sixth embodiment, when the fuel supply system is installed in, for example, an LNG carrier.

The fuel supply system of the sixth embodiment includes the recondenser 131. Therefore, all of the BOG generated in the storage tank 110 is not supplied to the cold box 121 of the reliquefaction apparatus 120, and at least a portion of the generated BOG is bypassed to the recondenser 131. Accordingly, a load on the reliquefaction apparatus 120 with large energy consumption can be reduced, or an operation of the reliquefaction apparatus 120 can be completely stopped in some cases.

During the ballast voyage with the storage tank 110 emptied, the amount of generated BOG is relatively small. In this case, the amount of fuel required by the high-pressure natural gas injection engine cannot be satisfied by only the BOG naturally generated in the storage tank 110. Therefore, the LNG stored in the storage tank 110 is supplied through the LNG supply line L17 directly to the recondenser 131.

Also, the BOG discharged from the storage tank 110 is compressed by the BOG compression unit 113 to a medium pressure of about 12 to 45 bara, and is cooled by the heat exchanger 135. All of the cooled BOG is supplied through the BOG bypass line L21 to the recondenser 131.

Since the amount of BOG generated during ballast voyage is small, all of the generated BOG can be supplied to and recondensed by the recondenser 131. That is, since all of the BOG generated in the storage tank 110 is recondensed by the recondenser 131 for most period of time during ballast voyage, an operation of the reliquefaction apparatus 120 may be stopped. However, in a case where the high-pressure natural gas injection engine operates at low speed or stops operating, such as a case where the marine structure is being towed during the ballast voyage, the high-pressure natural gas injection engine consumes no fuel or a very small amount of fuel. Therefore, all of the BOG generated in the storage tank 110 cannot be recondensed and used as fuel, and a portion of the generated BOG can be reliquefied by the reliquefaction apparatus 120. However, this is a very exceptional case during the ballast voyage.

Since the LNG supplied through the LNG supply line L17 to the recondenser 131 is subcooled, all of the BOG supplied through the BOG bypass line L21 may be condensed by receiving cold heat from the LNG while being mixed with the LBOG subcooled in the recondenser 131.

According to the fuel supply system of this embodiment, all of the BOG generated during ballast voyage can be recondensed in the recondenser 131 and used as fuel for the high-pressure natural gas injection engine. Accordingly, no LBOG returns to the storage tank 110.

Also, since all of the generated BOG can be processed in the recondenser 131, the reliquefaction apparatus 120 using much energy due to large power consumption cannot be operated at all. Thus, a considerable amount of energy can be saved.

On the other hand, when the storage tank 110 is laden with gas cargo during voyage, the amount of generated BOG is relatively large. In this case, since all of the BOG naturally generated in the storage tank 110 cannot be processed by the recondenser 131, the reliquefaction apparatus 120 is operated to reliquefy the BOG. If necessary, a portion of the generated BOG is bypassed through the BOG bypass line L21 to the recondenser 131 to reduce a reliquefaction load on the reliquefaction apparatus 120, thereby saving energy.

It may be inefficient to cool BOG to a subcooling temperature lower than a saturation temperature in order to subcool the BOG in the reliquefaction apparatus 120. However, when the BOG is subcooled to a saturation temperature, the saturated LBOG may be regasified while passing along a pipe. Therefore, it may be preferable to cool the BOG to a subcooling temperature at a corresponding pressure when liquefying the BOG in the reliquefaction apparatus 120.

In the case of the conventional reliquefaction apparatuses disclosed in International Patent Publication Nos. WO 2007/117148 and WO 2009/136793, since LBOG reliquefied by the reliquefaction apparatus is returned to an LNG storage tank, BOG is subcooled to a temperature much lower than a saturation temperature at a pressure of about 4 to 8 bara, in accordance with the internal temperature (about −163° C.) of the LNG storage tank.

However, according to the fuel supply system of the present invention, since the LBOG is supplied and used as fuel to the high-pressure natural gas injection engine, the BOG is compressed to a pressure of about 12 to 45 bara and the reliquefaction apparatus is operated with a reliquefaction temperature that is only about 1° C. lower than a saturation temperature at a corresponding pressure.

According to the present invention, since the LBOG reliquefied by the reliquefaction apparatus is not returned to the storage tank, it is unnecessary to consider the temperature and pressure of the LNG stored in the storage tank. In the conventional method, a pipe for transferring LBOG to a storage tank is relatively long. However, in the case of the present invention, since a pipe for transferring LBOG to a storage tank while maintaining a subcooled state of the LBOG is relatively short, it is unnecessary to subcool the BOG to a temperature excessively lower than the saturation temperature.

Therefore, the present invention operates the reliquefaction apparatus 120 while setting the liquefaction temperature of BOG to a temperature slightly lower than the saturation temperature (e.g., subcooled by about 0.5° C. to 3° C., preferably by about 1° C.), thereby reducing the power consumption of the reliquefaction apparatus.

In this case, the pressure control valve 161 installed on the bypass line L21 is on/off controlled such that the BOG cooled by heat exchange in the heat exchanger 135 can flow into the recondenser 131. Accordingly, the pressure of the recondenser 131 can be suitably controlled.

According to this embodiment, even when BOG is subcooled to a temperature about 1° C. lower than the saturation temperature and then is supplied to the recondenser 131, the BOG is compressed by the booster pump 132 and the high-pressure pump 133 while being supplied as fuel to the high-pressure natural gas injection engine. Therefore, the saturated LBOG can stably maintain a subcooled state due to a temperature increase.

As compared to the conventional fuel supply system, the fuel supply systems for a marine structure having a high-pressure natural gas injection engine according to the first to sixth embodiments and the modified examples thereof have the following advantages.

In general, BOG may be compressed to a high pressure in order to increase the BOG reliquefaction efficiency. However, in a conventional method, BOG is reliquefied by a reliquefaction apparatus and returned to a storage tank, and the LNG stored in the storage tank is maintained at an ambient pressure state. Therefore, if a pressure of the liquefied BOG is excessively high, flash gas may be generated when the BOG is returned to the storage tank. Therefore, the BOG needs to be compressed to a low pressure of about 4 to 8 bara, in spite of low reliquefaction efficiency.

As compared to the convention method, according to the present invention, since the BOG discharged from the storage tank is used as fuel for the high-pressure natural gas injection engine, the BOG can be compressed to a higher pressure and reliquefied without causing the generation of flash gas, thus increasing reliquefaction efficiency.

According to the present invention, since liquefied BOG is supplied as a fuel for a high-pressure natural gas injection engine (e.g., an ME-GI engine), the liquefied BOG need not be returned to the storage tank for re-storage in the storage tank, thus making it possible to prevent the generation of flash gas that may be caused when the BOG is returned to the storage tank. Also, since the generation of flash gas is suppressed, the BOG can be compressed to a higher pressure (i.e., a medium pressure of about 12 to 45 bara) for reliquefaction as compared to the conventional method. Since the BOG is compressed to a medium pressure and then reliquefied, reliquefaction efficiency can be improved regardless of the types of refrigerant. In particular, reliquefaction efficiency can be increased when a nonflammable mixed refrigerant is used instead of a nitrogen refrigerant. That is, as compared to the conventional reliquefaction apparatus using a nitrogen refrigerant, the reliquefaction apparatus using a nonflammable mixed refrigerant according to the present invention can reliquefy the BOG by considerably low energy and supply the liquefied BOG as fuel for the engine.

The reliquefaction apparatus 20/120 may have any configuration that can reliquefy BOG generated from liquefied gas such as LNG. For example, the reliquefaction apparatus 20/120 may be a reliquefaction system using a nonflammable mixed refrigerant, as described in the first to sixth embodiments and the modified examples thereof. Also, the reliquefaction apparatus 20/120 may be a conventional reliquefaction system using a mixed refrigerant or a nitrogen refrigerant. For example, the reliquefaction apparatus 20/120 may be any one of the reliquefaction apparatuses disclosed in International Patent Publication Nos. WO 2007/117148 and WO 2009/136793 and Korean Patent Application Publication Nos. 10-2006-0123675 and 10-2001-0089142.

According to the fuel supply system according to the present invention, all of the BOG generated in the storage tank is used as fuel for the high-pressure natural gas injection engine for most period of time during the voyage of the marine structure. Accordingly, the liquefied gas returning through the LBOG return line L4/L14 to the storage tank 11/110 can be removed. The LBOG return line L4/L14 may be used to return the LBOG from the buffer tank 31 or the recondenser 131 to the storage tank 11/110 only in exceptional cases where the power consumption of the high-pressure natural gas injection engine is much smaller than the amount of BOG generated in the storage tank, such as a case where the marine structure is towed to come alongside the quay, a case where the marine structure passes through a canal, and a case where the marine structure is sailing at low speed. The LBOG return line L4/L14 may also be used to return the LBOG, which remains in the buffer tank (or the recondenser) during the malfunction or the maintenance of the buffer tank (or the recondenser).

According to the present invention, all of the LBOG can be used in the engine for most period of time during the voyage of the marine structure without returning to the storage tank. In this case, since the returning LBOG itself is removed, it is possible to prevent the generation of flash gas that may be caused by a pressure difference while the LBOG is returned to the storage tank 11. In this specification, the expression "removing flash gas" means consuming generated flash gas to prevent flash gas from being supplied into the storage tank 11, and also means preventing the return of liquefied BOG to the storage tank to block and prevent the generation of flash gas itself that may be caused by the returning LBOG.

In the case of the conventional reliquefaction apparatuses disclosed in International Patent Publication Nos. WO 2007/117148 and WO 2009/136793 and Korean Patent Application Publication Nos. 10-2006-0123675 and 10-2001-0089142, since LBOG reliquefied by the reliquefaction apparatus is returned to an LNG storage tank, BOG is subcooled to a temperature much lower than a saturation temperature at a pressure of about 4 to 8 bara, in accordance with the internal temperature (about −163° C.) of the LNG storage tank.

For example, a conventional Mark III reliquefaction apparatus of Hamworthy Gas Systems (the technology disclosed in International Patent Publication No. WO 2007/117148) compresses the BOG to a pressure of 8 bara and liquefies the BOG at a temperature of −159° C. In this case, since the saturation temperature of the BOG is about −149.5° C., the BOG is subcooled by about 9 to 10° C. The BOG needs to be subcooled by such a degree in order to prevent the generation of flash gas when the liquefied BOG is returned to the LNG storage tank. However, since the liquefied BOG is compressed by the high-pressure pump while the liquefied BOG is supplied as fuel for the high-pressure natural gas injection engine, the LBOG saturated by the increased pressure can stably maintain the overcooled state later. Therefore, according to the present invention, the liquefied BOG may be liquefied by overcooling as much as 0.5 to 3° C., preferably about 1° C., as compared to the saturation temperature at the corresponding pressure, and then supplied as fuel. As the level of subcooling in the reliquefaction apparatus decreases, reliquefaction energy reduction effect increases. For example, the energy for subcooling by 1° C. at a temperature of −150° C. is 1% of the total power required for reliquefaction.

According to the fuel supply system of the present invention, since the LBOG is supplied and used as fuel for the high-pressure natural gas injection engine, the BOG is compressed to a pressure of about 12 to 45 bara and the reliquefaction apparatus is operated with a reliquefaction temperature that is about 0.5~3° C. (preferably 1° C.) lower than a saturation temperature at a corresponding pressure.

According to the present invention, since the LBOG reliquefied by the reliquefaction apparatus is not returned to the storage tank, it is unnecessary to consider the temperature and pressure of the LNG stored in the storage tank. In the conventional method, a pipe for transferring LBOG to a storage tank is relatively long. However, in the case of the present invention, since a pipe for transferring LBOG to a storage tank while maintaining a subcooled state of the LBOG is relatively short (e.g., the length between the reliquefaction apparatus (e.g., the gas-liquid separator) and the high-pressure pump), it is unnecessary to subcool the BOG to a temperature excessively lower than the saturation temperature.

That is, the high-pressure natural gas injection engine may require a larger amount of fuel than an amount of the BOG generated in the LNG storage tank for a considerable period of time during the voyage of the marine structure. In this case, all of the liquefied BOG is supplied to the high-pressure natural gas injection engine, thereby preventing the generation of flash gas when the liquefied BOG is returned to the LNG storage tank.

Therefore, the present invention operates the reliquefaction apparatus 120 while setting the liquefaction temperature of BOG to a temperature slightly lower than the saturation temperature (e.g., subcooled by about 0.5° C. to 3° C., preferably by about 1° C.), thereby reducing the power consumption of the reliquefaction apparatus.

According to this embodiment, even when BOG is subcooled to a temperature about 0.5~3° C. lower than the saturation temperature and then is supplied to the buffer tank 31, the BOG is compressed by the high-pressure pump 33 while being supplied as fuel to the high-pressure natural gas injection engine. Therefore, the saturated LBOG can stably maintain a subcooled state due to a temperature increase.

Also, since the LBOG supplied to the high-pressure pump is compressed to a medium pressure, the power required to pump the LBOG by the high-pressure pump can be reduced.

In a marine structure having a conventional reliquefaction apparatus, since BOG is reliquefied, keeping it mind to return the BOG to a storage tank, the BOG is compressed to a low pressure of about 4 to 8 bara in order to suppress the generation of flash gas when the BOG is returned to the storage tank. However, in the fuel supply system of the present invention, since the BOG is reliquefied and all of the BOG is used as fuel for the high-pressure natural gas injection engine, the BOG is compressed to a relatively high pressure of about 12 to 45 bara. This is the novel and inventive concept of the present invention, which was not conceived in the conventional method of returning BOG to a storage tank after reliquefaction of the BOG.

In the conventional method, flash gas is generated by decompression during the return of LBOG to a storage tank, and the flash gas is returned to a reliquefaction apparatus, thus degrading the efficiency of the reliquefaction apparatus. However, the present invention uses all of the LBOG as fuel for the high-pressure natural gas injection engine without decompression (performing compression instead), thus improving the efficiency of the reliquefaction apparatus as compared to the conventional method.

According to the fuel supply system of the present invention, since the BOG is reliquefied and all of the liquefied BOG is used as fuel for the high-pressure natural gas injection engine, the BOG can be compressed to a relatively high pressure of about 12 to 45 bara. Accordingly, as described with reference to FIG. 6B, the reliquefaction apparatus according to the present invention can be operated with 50 to 80% of power consumed in the conventional reliquefaction apparatus (refrigeration cycle). As such, since the reliquefaction apparatus according to the present invention can be operated with relatively low power as compared to the related art, the capacity of a power generator can be reduced, thus making it possible to miniaturize the power generator.

The conventional reliquefaction apparatus consumes a power of about 1 to 1.5 MW for operation in a standby state. However, according to the present invention, as described in the sixth embodiment, since an operation of the reliquefaction apparatus can be stopped for most period of time during ballast voyage, the power consumption of the reliquefaction apparatus can be reduced. For example, assuming that an annual ballast voyage period is 150 days and a diesel power generator with a power consumption of 183 g/kWh is used to operate the reliquefaction apparatus, 660 to 923 tons of HFO can be saved annually. Since the price of HFO in Singapore is 671 USD/ton as of mid September 2011, 0.4 to 0.6 mil USD can be saved annually.

(First Modified Example of Sixth Embodiment)

Figure 12:
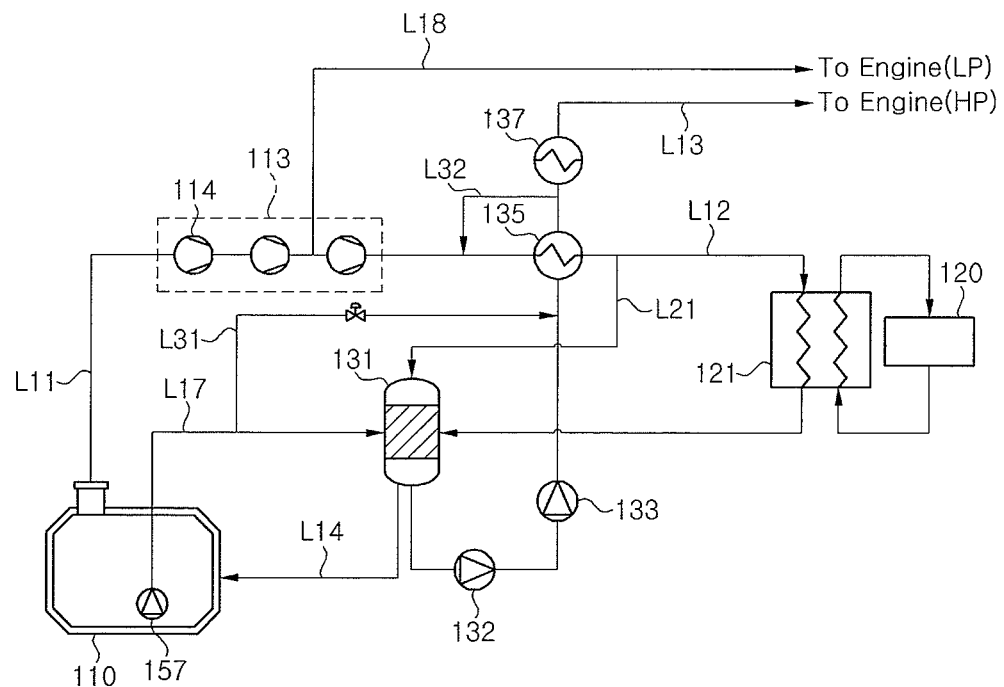
FIG. 12 is a configuration diagram illustrating a fuel supply system for a high-pressure natural gas injection engine according to a first modified example of the sixth embodiment of the present invention.

FIG. 12 is a configuration diagram illustrating a fuel supply system according to a first modified example of the sixth embodiment of the present invention. The first modified example of the sixth embodiment is different from the sixth embodiment in that the fuel supply system includes a precooling unit configured to precool BOG supplied to a reliquefaction apparatus when fuel supply to a high-pressure natural gas injection engine is interrupted, in order to minimize energy consumption in the reliquefaction apparatus.

The precooling unit according to the first modified example of the sixth embodiment includes an LNG branch line L31 branching from an LNG supply line L17 and connecting with a fuel supply line L13 at the downstream side of a high-pressure pump 133 (i.e., the upstream side of a heat exchanger 135), and an LNG joint line L32 branching from a fuel supply line L13 at the downstream side of the heat exchanger 135 and connecting with a BOG supply line L12 at the downstream of a BOG compression unit 113.

The BOG discharged from a storage tank 110 may be cooled by heat exchange in the heat exchanger 135 before supply to a cold box 121 of a reliquefaction apparatus 120, thereby reducing the energy consumption of the reliquefaction apparatus 120. A cold heat source in the heat exchanger 135 is the fuel (i.e., LNG) supplied from the high-pressure pump 133 to the high-pressure natural gas injection engine. Therefore, the cold heat source disappears when an operation of the high-pressure natural gas injection engine is stopped and fuel supply is interrupted. In this case, according to the first modified example of the sixth embodiment, the cold heat of the LNG in the storage tank 110 can be transmitted through the precooling unit to BOG to cool the BOG. Accordingly, the BOG supplied to the reliquefaction apparatus 120 can be efficiently reliquefied even when an operation of the high-pressure natural gas injection engine.

The LNG supplied to the heat exchanger 135 through the LNG branch line L31 branching from the LNG supply line L17 is heated and cools the BOG by heat exchange in the heat exchanger 135. The heated LNG is at least partially gasified and then joins with the BOG through the LNG joint line L32.

A temperature control valve may be installed at the LNG branch line L31 to control the supply of LNG, thereby controlling the precooling temperature of BOG. The LNG branch line L31 may branch from the LNG supply line L17, or may include a separate pipe extending from the LNG storage tank 110. Although not illustrated, a booster pump 158 (see FIG. 11) may be installed at the LNG supply line L17.

(Second Modified Example of Sixth Embodiment)

Figure 13:
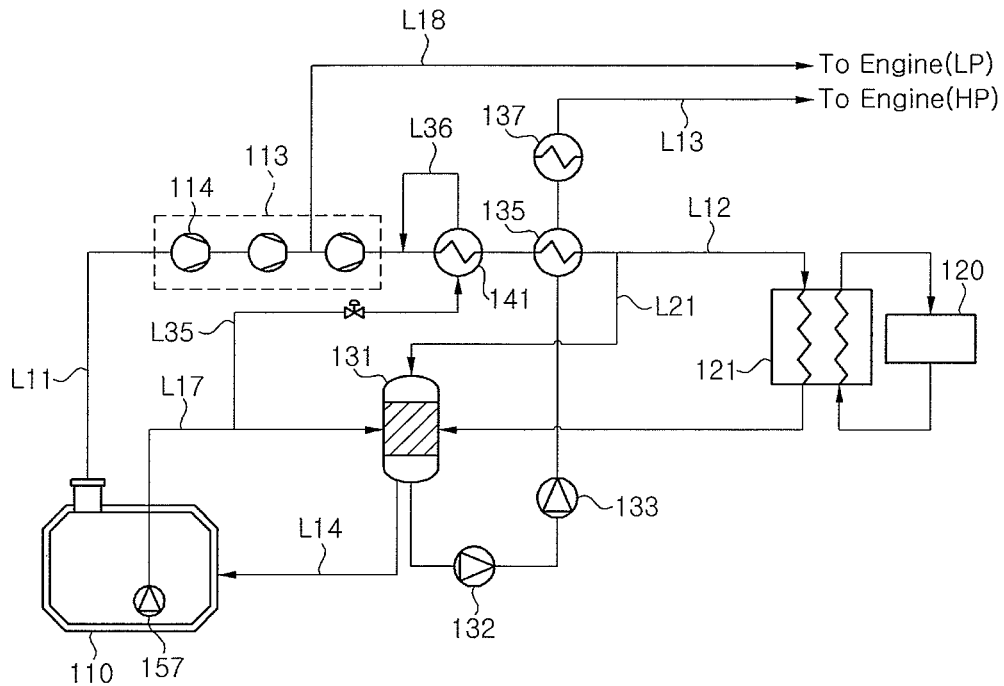
FIG. 13 is a configuration diagram illustrating a fuel supply system for a high-pressure natural gas injection engine according to a second modified example of the sixth embodiment of the present invention.

FIG. 13 is a configuration diagram illustrating a fuel supply system according to a second modified example of the sixth embodiment of the present invention. The second modified example of the sixth embodiment is different from the sixth embodiment in that the fuel supply system includes a precooling unit configured to precool BOG supplied to a reliquefaction apparatus when fuel supply to a high-pressure natural gas injection engine is interrupted, in order to minimize energy consumption in the reliquefaction apparatus.

Unlike the precooling unit according to the first modified example of the sixth embodiment, the precooling unit according to the second modified example of the sixth embodiment includes a BOG precooling heat exchanger 141 installed at a BOG supply line L12 at the upstream side of a heat exchanger 135, an LNG branch line L35 branching from an LNG supply line L17 and connecting with the BOG precooling heat exchanger 141, and an LNG joint line L36 extending from the BOG precooling heat exchanger 141 and connecting with a BOG supply line L12 at the upstream of the BOG precooling heat exchanger 141.

The BOG discharged from a storage tank 110 may be cooled by heat exchange in the heat exchanger 135 before supply to a cold box 121 of a reliquefaction apparatus 120, thereby reducing the energy consumption of the reliquefaction apparatus 120. A cold heat source in the heat exchanger 135 is the fuel (i.e., LNG) supplied from the high-pressure pump 133 to the high-pressure natural gas injection engine. Therefore, the cold heat source disappears when an operation of the high-pressure natural gas injection engine is stopped and fuel supply is interrupted. In this case, according to the second modified example of the sixth embodiment, the cold heat of the LNG in the storage tank 110 can be transmitted through the precooling unit to BOG to cool the BOG. Accordingly, the BOG supplied to the reliquefaction apparatus 120 can be efficiently reliquefied even when an operation of the high-pressure natural gas injection engine.

The LNG supplied to the BOG precooling heat exchanger 141 through the LNG branch line L35 branching from the LNG supply line L17 is heated and cools the BOG by heat exchange. The heated LNG is at least partially gasified and then joins with the BOG through the LNG joint line L36.

A temperature control valve may be installed at an LNG branch line L31 to control the supply of LNG, thereby controlling the precooling temperature of BOG. The LNG branch line L35 may branch from the LNG supply line L17, or may include a separate pipe extending from the LNG storage tank 110. Although not illustrated, a booster pump 158 (see FIG. 11) may be installed at the LNG supply line L17.

According to the first and second modified examples of the sixth embodiment, the BOG can be efficiently reliquefied even in the case where an operation of the high-pressure natural gas injection engine is stopped while BOG is continuously generated from the LNG stored in the storage tank 110, such as a case where the marine structure is waiting to unload the LNG, and a case where the marine structure is being towed in a port or a canal.

(Third Modified Example of Sixth Embodiment)

Figure 14:
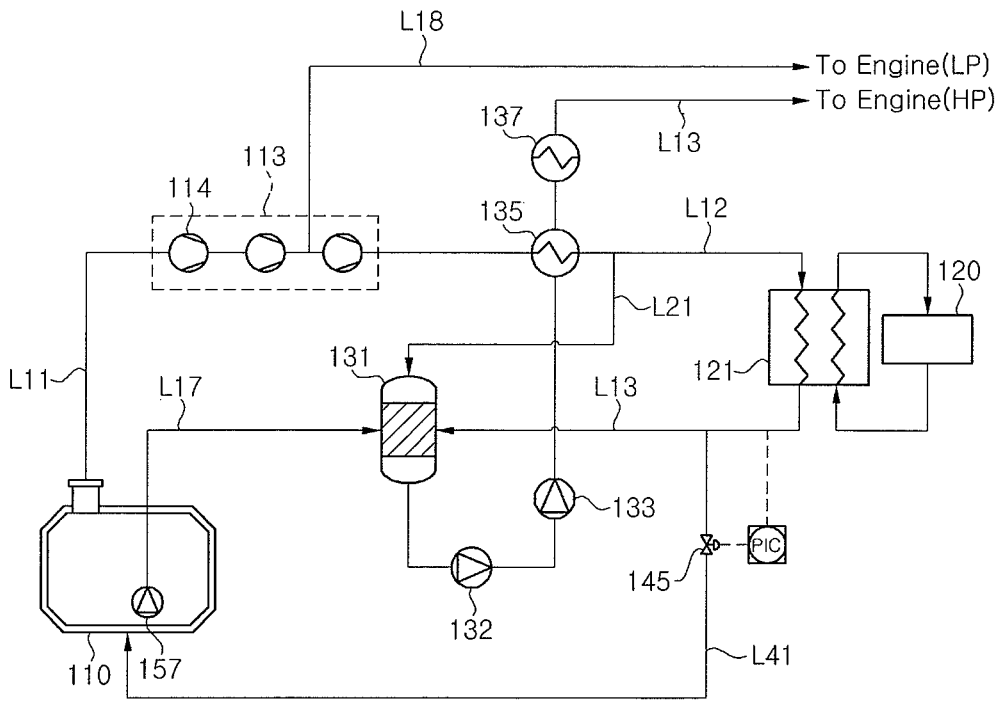
FIG. 14 is a configuration diagram illustrating a fuel supply system for a high-pressure natural gas injection engine according to a third modified example of the sixth embodiment of the present invention.

FIG. 14 is a configuration diagram illustrating a fuel supply system according to a third modified example of the sixth embodiment of the present invention. The third modified example of the sixth embodiment is different from the sixth embodiment in that the fuel supply system includes an LBOG return line L41 that branches from the middle of a fuel supply line L13 supplying fuel from a reliquefaction apparatus through a high-pressure pump 133 to a high-pressure natural gas injection engine and returns LBOG to a storage tank 110.

According to the third modified example of the sixth embodiment, an LBOG return line L41 branches at the downstream side of a reliquefaction apparatus 120, i.e., between a high-pressure pump 133 and a cold box 121 of the reliquefaction apparatus 120. Specifically, the LBOG return line L41 may branch between a recondenser 131 and the cold box 121 of the reliquefaction apparatus 120.

As compared to the case where the LBOG return line extends from the recondenser 131 in the sixth embodiment, the inflow of heat energy into the returning LBOG according to the third modified example of the sixth embodiment can be reduced.

In order to stably operate the reliquefaction apparatus, it may be necessary to constantly maintain the pressure at the upstream side of the high-pressure pump, i.e., the back pressure at the rear end of the cold box 121 that is the main heat exchanger. According to the third modified example of the sixth embodiment, a pressure control valve 145 is installed at the LBOG return line L41 to maintain the pressure of the fuel supply line L13 at a predetermined pressure. The installation of the pressure control valve 145 makes it possible to stably operate the reliquefaction apparatus and also control the flow of fuel supplied through the fuel supply line.

Although not illustrated, a booster pump 158 (see FIG. 11) may be installed at the LNG supply line L17. Also, although not illustrated, the expansion valve and the gas-liquid separator of the fourth and fifth embodiments and the modified examples thereof described with reference to FIGS. 9A to 10B may be installed at the LBOG return line L14, and a unit configured to process generated flash gas or suppress the generation of flash gas may be installed.

Also, according to the second modified example of the sixth embodiment, a general suction drum may be installed instead of the recondenser 131.

(Fourth Modified Example of Sixth Embodiment)

Figure 15:
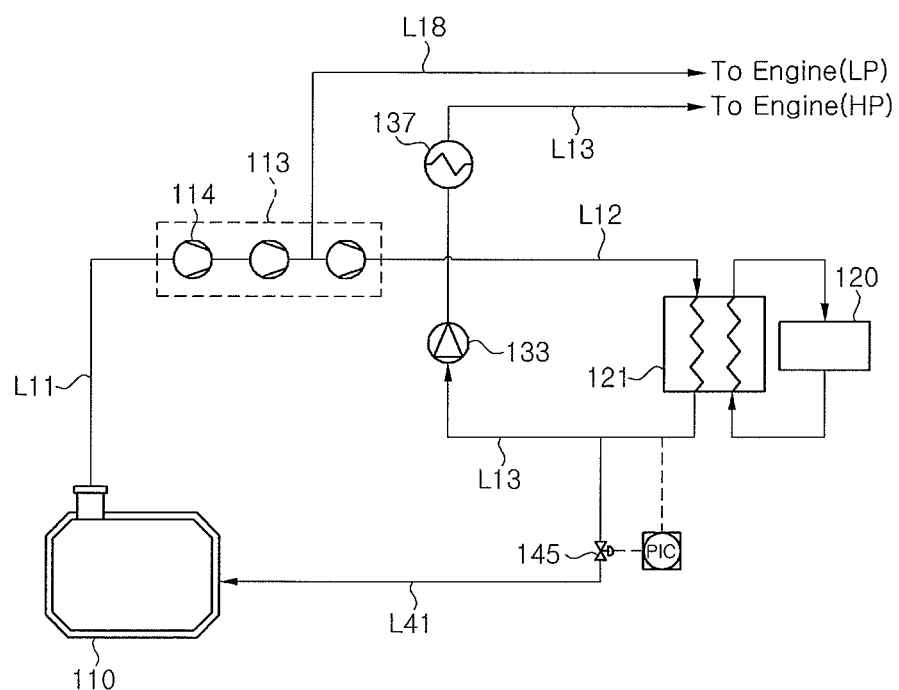
FIG. 15 is a configuration diagram illustrating a fuel supply system for a high-pressure natural gas injection engine according to a fourth modified example of the sixth embodiment of the present invention.

FIG. 15 is a configuration diagram illustrating a fuel supply system according to a fourth modified example of the sixth embodiment of the present invention. The fourth modified example of the sixth embodiment is different from the sixth embodiment in that the fuel supply system includes an LBOG return line L41 that branches from the middle of a fuel supply line L13 supplying fuel from a reliquefaction apparatus through a high-pressure pump 133 to a high-pressure natural gas injection engine and returns LBOG to a storage tank 110. Also, the fourth modified example of the sixth embodiment is different from the sixth embodiment in that the fuel supply system supplies LBOG from a reliquefaction apparatus directly to a high-pressure pump 133 without including a recondenser.

The LBOG return line L41 according to the fourth modified example of the sixth embodiment branches at the downstream side of the reliquefaction apparatus 120, that is, between the high-pressure pump 133 and a cold box 121 of the reliquefaction apparatus 120.

As compared to the case where the LBOG return line extends from the recondenser 131 in the sixth embodiment, the inflow of heat energy into the returning LBOG according to the fourth modified example of the sixth embodiment can be reduced.

In order to stably operate the reliquefaction apparatus, it may be necessary to constantly maintain the pressure at the upstream side of the high-pressure pump, i.e., the back pressure at the rear end of the cold box 121 that is the main heat exchanger. According to the third modified example of the sixth embodiment, a pressure control valve 145 is installed at the LBOG return line L41 to maintain the pressure of the fuel supply line L13 at a predetermined pressure. The installation of the pressure control valve 145 makes it possible to stably operate the reliquefaction apparatus and also control the flow of fuel supplied through the fuel supply line.

Although not illustrated, a booster pump 158 (see FIG. 11) may be installed at the LNG supply line L17. Also, although not illustrated, the expansion valve and the gas-liquid separator of the fourth and fifth embodiments and the modified examples thereof described with reference to FIGS. 9A to 10B may be installed at the LBOG return line L14, and a unit configured to process generated flash gas or suppress the generation of flash gas may be installed.

It has been described above that that the fuel supply system and method of the present invention are applied to a marine structure such as an LNG carrier. However, it will be readily understood that the fuel supply system and method of the present invention are also applicable to fuel supply to a high-pressure natural gas injection engine on land.

While the embodiments of the present invention has been described with reference to the specific embodiments, it will be apparent to those skilled in the art that various changes and modifications may be made without departing from the spirit and scope of the invention as defined in the following claims.

What is claimed is:

1. A method for operating a fuel supply system to supply fuel to a high-pressure natural gas injection engine, the fuel supply system including a boil-off gas (BOG) compression unit configured to receive and compress BOG generated in a storage tank, a reliquefaction apparatus configured to receive and liquefy the BOG compressed by the BOG compression unit, a high-pressure pump configured to compress the liquefied BOG generated by the reliquefaction apparatus, and a high-pressure gasifier configured to gasify the liquefied BOG compressed by the high-pressure pump, wherein:

the fuel supply system comprises a recondenser installed at an upstream side of the high-pressure pump; and the recondenser recondenses a portion or all of the generated BOG by using liquefied gas supplied from the storage tank, wherein during a ballast voyage process, all of the BOG is supplied to and recondensed by the recondenser, and an operation of the reliquefaction apparatus is interrupted.

2. The method according to claim 1, wherein liquefied natural gas (LNG) stored in the storage tank is supplied through an LNG supply line to the recondenser.

3. The method according to claim 1, wherein BOG discharged from the storage tank is compressed to about 12 to 45 bara and then is supplied to the recondenser.

4. The method according to claim 1, wherein when the storage tank is laden with liquefied gas cargo, BOG naturally generated in the storage tank is supplied to and reliquefied by the reliquefaction apparatus.

5. The method according to claim 4, wherein a portion of the BOG generated in the storage tank is bypassed through a BOG bypass line to the recondenser to reduce a reliquefaction load on the reliquefaction apparatus.

6. The method according to claim 1, wherein a booster pump is installed between the recondenser and the high-pressure pump.

7. The method according to claim 1, wherein LNG stored in the storage tank is supplied to the recondenser by a submerged pump located in the storage tank.

8. The method according to claim 7, wherein LNG discharged from the storage tank is compressed by a booster pump to a pressure equal to an internal pressure of the recondenser and then is supplied to the recondenser.

9. The method according to claim 1, wherein the BOG compressed by the BOG compression unit and the liquefied BOG compressed by the high-pressure pump exchange heat with each other in a heat exchanger, so that the BOG is cooled and supplied to at least one of the reliquefaction apparatus and the recondenser, and the liquefied BOG is heated and supplied to the high-pressure gasifier.

10. The method according to claim 1, wherein LNG discharged from the storage tank is compressed by a booster pump to a pressure equal to an internal pressure of the recondenser and then is supplied to the recondenser.

* * * * *